(12) United States Patent
Ohmori et al.

(10) Patent No.: US 7,020,636 B2
(45) Date of Patent: Mar. 28, 2006

(54) STORAGE-MEDIUM RENTAL SYSTEM

(75) Inventors: Motoji Ohmori, Hirakata (JP);
Masataka Minami, Arcadia, CA (US);
Masaya Yamamoto, Hirakata (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 186 days.

(21) Appl. No.: 10/234,093

(22) Filed: Sep. 5, 2002

(65) Prior Publication Data

US 2004/0049464 A1 Mar. 11, 2004

(51) Int. Cl.
*G06F 17/60* (2006.01)

(52) U.S. Cl. .............................. 705/51; 705/1; 705/56; 84/607; 706/23

(58) Field of Classification Search ................. 705/51, 705/1, 56; 84/609; 706/23
See application file for complete search history.

(56) References Cited

U.S. PATENT DOCUMENTS

| | | | | |
|---|---|---|---|---|
| 5,629,980 | A * | 5/1997 | Stefik et al. ................... | 705/54 |
| 5,809,145 | A * | 9/1998 | Slik et al. ....................... | 705/52 |
| 5,857,020 | A * | 1/1999 | Peterson, Jr. .................. | 705/52 |
| 6,131,090 | A * | 10/2000 | Basso et al. ................... | 706/23 |
| 6,236,971 | B1 * | 5/2001 | Stefik et al. .................... | 705/1 |
| 6,240,401 | B1 * | 5/2001 | Oren et al. .................... | 705/40 |
| 6,334,118 | B1 | 12/2001 | Benson | |
| 6,463,539 | B1 | 10/2002 | Mochizuki | |
| 6,470,085 | B1 * | 10/2002 | Uranaka et al. ............ | 380/231 |
| 6,515,212 | B1 * | 2/2003 | Taira et al. .................... | 84/609 |
| 6,708,879 | B1 | 3/2004 | Hunt | |
| 6,789,192 | B1 * | 9/2004 | Hirota et al. ................ | 713/172 |
| 2002/0026445 | A1 * | 2/2002 | Chica et al. ................. | 707/100 |

FOREIGN PATENT DOCUMENTS

WO WO 95/16238 * 6/1995

OTHER PUBLICATIONS

A License Management Model to Support B2C and C2C music sharing, S.H. Kwok and S.M. Lui.*

* cited by examiner

*Primary Examiner*—James P Trammell
*Assistant Examiner*—John M. Winter
(74) *Attorney, Agent, or Firm*—Wenderoth, Lind & Ponack, L.L.P.

(57) ABSTRACT

A storage-medium rental system includes a portable storage medium to be rented to the user, a portable semiconductor memory owned by the user, a rental-shop apparatus owned by the rental agent, and a reproduction apparatus owned by the user. The storage medium prestores encrypted content which is generated by encrypting digital work by using a content encryption key. The semiconductor memory has an area for securely storing a content decryption key. The rental-shop apparatus stores a content decryption key for decrypting the encrypted content. The rental-shop apparatus writes the content decryption key to the semiconductor memory. The reproduction apparatus securely reads the content decryption key from the semiconductor memory, reads the encrypted content from the storage medium, decrypts the encrypted content by using the content decryption key, and reproduces the decrypted content.

17 Claims, 16 Drawing Sheets

FIG.3

RENTAL-SHOP MEMBERSHIP TABLE ~151

| MEMBERSHIP INFORMATION ||||||
|---|---|---|---|---|
| MEMBER NUMBER | MEMBER NAME | ADDRESS | BIRTH DATE | TELEPHONE NUMBER |
| 12346 | ICHIRO YAMADA | OSAKA CITY ... | 1972.1.1 | 0123-45-6789 |
| 23456 | JIRO SATO | KYOTO CITY ... | 1980.2.1 | 0123-45-7789 |
| ... | ... | ... | ... | ... |

FIG.4

RENTAL-USE MANAGEMENT TABLE ~152

| USE MANAGEMENT INFORMATION | | | | |
|---|---|---|---|---|
| TITLE ID | MEMBER NUMBER | RENTAL START DATE | RENTAL END DATE | RENTAL PRICE |
| XYZ123 | 1234 | 2002.7.1 | 2002.7.10 | ¥1000 |
| ... | ... | ... | ... | ... |

STORAGE-MEDIUM RENTAL SYSTEM

BACKGROUND OF THE INVENTION (1) Field of the Invention

The present invention relates to a technique for renting a storage medium which stores digital content.

(2) Description of the Related Art

Storage mediums such as DVDs for digitally storing a work including movies and music have become increasingly widespread. High-volume information can be digitally stored in such storage mediums as DVDs and can be used semi-permanently.

By taking advantage of such storage mediums, a rental-service business for renting storage mediums which store movies, music, etc., has been developed to create a huge market.

Japanese Laid-open Patent Application No. H11-164238 discloses the following technique which is aimed at billing users economically in accordance with the reproduction conditions of a work. At a rental shop, a user selects, from a group of discs, a disc which stores information that the user wants. At the rental shop, information pertaining to the selected disc, such as a serial number, a catalogue number, a specified reproduction time, and a reproduction number (=0), is written to an IC card that is owned by the user. The user plays the disc by using a player to reproduce the information stored therein. Here, a reproduction time is measured and accumulated. When the accumulated reproduction time exceeds the specified reproduction time, the reproduction number, which is the number of times the disc is played, is counted as one. The user may play the disc a plural number of times, and the counted reproduction number is written to the IC card. When the user returns the disc and the IC card, data in the IC card is read at the rental shop and an amount of payment is calculated in accordance with the reproduction number.

Also, Japanese Laid-open Patent Application No. H11-167768 discloses the following technique which is aimed at managing a rental time limit so that a rented disc can be played only within a rental-use period for the disc. At a rental shop, a user selects, from a number of discs, a disc which stores software information that the user wants. Each disc also stores its unique management information. Information pertaining to the selected disc, i.e., unique management information and rental-use time limit information of the selected disc, is written to an IC card by an IC card writing apparatus. Then, the user is given this IC card together with the selected disc. The user brings home the disc and the IC card, and sets them on a special player. The player can play the disc only within the rental-use period that is written in the IC card.

Moreover, Japanese Laid-open Patent Application No. 2002-50126 discloses the following technique which aimed at providing, at low costs, a reproduction apparatus that prevents reproduction of data in a storage medium whose rental time limit is expired, a storage medium, and a rental system. A data reproduction apparatus is equipped with a data reproduction control unit. The data reproduction control unit starts clocking time with an initial value being the start date and time of a reproduction-allowed period shown by management information. The reproduction-allowed period is a time period during which data is allowed to be reproduced. The data reproduction control unit allows the data to be reproduced until the kept date and time reaches the end date and the time of the reproduction-allowed period. The rental system of this invention includes a data writing apparatus which writes, to a storage medium, data and its management information showing a reproduction-allowed period during which the data is allowed to be reproduced, the storage medium which stores the data and the management information, and the above-described data reproduction apparatus.

Further, Japanese Laid-open Patent Application No. 2002-149061 discloses the following technique which is aimed at providing a distribution system and a distribution method that improve user convenience, eliminate profit loss of a merchant, and realize secure content protection in the field of digital content distribution. Mutual authentication is performed between a reproduction apparatus and an IC card and also between the IC card and a management center. The IC card transmits, to the management center, a certificate of a reproduction apparatus public key that has been received from the reproduction apparatus. A user inputs, using a terminal, contract information including a content title and a rental period. The management center receives the contract information to which a signature of the IC card is added, encrypts a content encryption key and the like using the reproduction apparatus public key and the like, adds a signature to the encrypted data, and transmits the data with the signature to the terminal. The terminal writes the transmitted data to the IC card. When the signature matching succeeds, the terminal stores the content into the storage medium. The reproduction apparatus decrypts the encrypted content encryption key received from the IC card, and decrypts the content by using the content encryption key.

There are increasing demands from rental agents that rent storage mediums which store movies, music, etc. for effectively limiting the users' use of work stored in such storage mediums.

SUMMARY OF THE INVENTION

To satisfy the above-mentioned demands, an object of the present invention is to provide a rental system, a reproduction apparatus, a rental-shop apparatus, a rental method, a storage medium, and a rental program that can limit a user's use of a storage medium which stores digital work when the storage medium is rented to the user.

In a storage-medium rental system of the present invention, a rental agent rents a storage medium which stores digital work to a user so as to provide the digital work to the user. The system includes a portable storage medium to be rented to the user, a portable semiconductor memory owned by the user, a rental-shop apparatus owned by the rental agent, and a reproduction apparatus owned by the user. The storage medium prestores encrypted content which is generated by encrypting digital work by using a content encryption key. The semiconductor memory has an area for securely storing a content decryption key. The rental-shop apparatus stores a content decryption key for decrypting the encrypted content. When the user rents the storage medium at a rental shop, the semiconductor memory is mounted on (inserted into) the rental-shop apparatus. When the rental agent receives a user's payment for the rental, the rental-shop apparatus writes the content decryption key to the semiconductor memory. To reproduce the digital work, the user mounts (inserts) the semiconductor memory and the storage medium on (in) the reproduction apparatus. The reproduction apparatus securely reads the content decryption key from the semiconductor memory, reads the encrypted content from the storage medium, decrypts the encrypted content by using the content decryption key, and reproduces the decrypted content.

The above-described object of the present invention can be achieved by a storage-medium rental system for temporarily providing, from a rental agent to a user, a right to use digital work which is stored on a portable storage medium, where a portable semiconductor memory is connected to a rental-shop apparatus when the rental agent rents the user the storage medium, and the storage medium and the semiconductor memory are connected to a reproduction apparatus when the user reproduces the digital work. The storage-medium rental system includes the storage medium that prestores content information which represents the digital work, and the semiconductor memory that has an area for securely storing information. The storage-medium rental system also includes the rental-shop apparatus that securely writes right information into the area of the semiconductor memory when the rental agent rents the user the storage medium, where the right information shows a range of the right to use the digital work which is stored on the storage medium. The storage-medium rental system also includes the reproduction apparatus that, upon receipt of an instruction from the user to reproduce the digital work, (a) securely reads the right information from the area of the semiconductor memory, (b) judges whether the digital work is allowed to be used or not based on the read right information, and (c) reads the content information from the storage medium and reproduces the digital work based on the read content information only when the reproduction apparatus judges that the digital work is allowed to be used.

According to this construction, the rental-shop apparatus securely writes the right information to the semiconductor memory, and the reproduction apparatus securely reads the right information from the semiconductor memory and judges whether the digital work which is stored on the storage medium is allowed to be used or not based on the read right information. Therefore, only the user who owns the semiconductor memory can reproduce the digital work.

Here, the user may make a rental payment to the rental agent when the rental agent rents the user the storage medium, and the rental-shop apparatus may securely write the right information into the area of the semiconductor memory when the rental agent receives the rental payment from the user.

According to this construction, the rental-shop apparatus securely writes the right information to the semiconductor memory when the rental agent receives the rental payment from the user. Therefore, the semiconductor memory can be used to guarantee that the user has properly made the rental payment to the rental agent.

Here, the content information which is stored on the storage medium may have been generated by encrypting the digital work by using an encryption key, the rental-shop apparatus may write the right information including a decryption key to be used to decrypt the content information into the area of the semiconductor memory, and the reproduction apparatus may decrypt the read content information by using the decryption key which is included in the read right information so as to generate the digital work only when judging that the digital work is allowed to be used.

According to this construction, the reproduction apparatus decrypts the read content information by using the decryption key which is included in the read right information. Therefore, only the user who owns the semiconductor memory can decrypt the content information.

Here, the rental-shop apparatus may securely write the right information including reproduction-limiting information into the area of the semiconductor memory, where the reproduction-limiting information shows (indicates) a limitation that is to be imposed on the reproduction of the digital work which is stored on the storage medium, and the reproduction apparatus may judge whether the digital work is allowed to be used or not based on the reproduction-limiting information that is included in the read right information.

According to this construction, the reproduction apparatus judges whether the digital work is allowed to be used or not based on the reproduction-limiting information that is included in the right information read from the semiconductor memory. This construction can properly limit the use of the digital work by the user who owns the semiconductor memory.

Here, the reproduction-limiting information may show a rental-use time limit until when the rental agent allows the user to use the digital work which is stored on the storage medium, the rental-shop apparatus may write the right information including the rental-use time limit. Accordingly, the reproduction apparatus may compare the rental-use time limit that is included in the right information with a present date and time, and judge whether the digital work is allowed to be used when the rental-use time limit is on or after the present date and time.

According to this construction, a rental-use time limit can be set for the user who owns the semiconductor memory.

Here, the reproduction-limiting information may show (indicate) a rental-use period during which the rental agent allows the user to use the digital work which is stored on the storage medium, where the rental-use period begins from a time at which the user first reproduces the digital work which is stored on the storage medium, the rental-shop apparatus may write the right information including the rental-use period. Accordingly, the reproduction apparatus may compare an elapsed date and time at which the rental-use period elapses from the time at which the user first reproduced the digital work with a present date and time, and judge whether the digital work is allowed to be used when the elapsed date and time is on or after the present date and time.

According to this construction, a rental-use period can be set for the user who owns the semiconductor memory.

Here, the reproduction-limiting information may show (indicate) a number of times the user is allowed to reproduce the digital work which is stored on the storage medium, the rental-shop apparatus may write the right information including the number of times the user is allowed to reproduce the digital work. The reproduction apparatus may count a number of times the digital work has been reproduced every time the digital work is reproduced, and judge whether the digital work is allowed to be used only when the counted number of times does not exceed the number of times the user is allowed to reproduce the digital work included in the right information.

According to this construction, the number of times reproduction is allowed can be set for the user who owns the semiconductor memory.

Here, the storage medium may store first identification information in correspondence with the content information, where the first identification information identifies the digital work, the rental-shop apparatus may write the right information including second identification information into the area of the semiconductor memory, where the second identification information identifies the digital work, and the reproduction apparatus may compare the first identification information that is stored in the storage medium and the second identification information that is included in the read right information, and, only when the first identification information and the second identification information match, judge that the digital work that is identified by the content information stored in correspondence with the first identification information is allowed to be used.

According to this construction, the reproduction apparatus compares the first identification information that is stored in the storage medium and the second identification information that is included in the read right information, and judges whether the digital work which is represented by the content information stored in correspondence with the first identification information is allowed to be used only when the first identification information and the second identification information match. This can ensure that the use of digital work by the user who owns the semiconductor memory is limited only to digital work that is allowed to be reproduced.

Here, the content information that is stored in the storage medium may have been generated by encrypting the digital work by using a content key. The rental-shop apparatus may securely write the right information including an encrypted content key that has been generated by encrypting the content key by using a device key into the area of the semiconductor memory, the semiconductor memory may further prestore the device key in the area, where the device key is unique to the semiconductor memory, the semiconductor memory may further include a decryption unit for decrypting the encrypted content key that is stored in the area by using the device key stored in the area so as to generate the content key, and output the generated content key. Further, the reproduction apparatus, upon receipt of the reproduction instruction from the user, may receive the content key from the semiconductor memory, and decrypt the read content information by using the received content key so as to generate the digital work.

According to this construction, the semiconductor memory prestores the device key in the area, and includes the decryption unit that decrypts the encrypted content key that is stored in the area by using the device key so as to generate the content key and to output the generated content key. Therefore, the possibility of the decryption unit being decoded can be reduced.

Here, the content information that is stored in the storage medium may have been generated by encrypting the digital work by using a content key, the storage medium may store a disc key that is unique to the storage medium, the rental shop apparatus may securely write the right information including an encrypted content key that has been generated by encrypting the content key by using the disc key into the area of the semiconductor memory, the semiconductor memory may further include a decryption unit for obtaining the disc key from the storage medium via the reproduction apparatus, decrypting the encrypted content key stored in the area using the obtained disc key so as to generate the content key and to output the generated content key, and the reproduction apparatus, upon receipt of the reproduction instruction from the user, may receive the content key from the semiconductor memory and decrypt the read content information by using the received content key so as to generate the digital work.

According to this construction, the semiconductor memory obtains the disc key from the storage medium via the reproduction apparatus, decrypts the encrypted content key that is stored in the area so as to generate the content key, and outputs the generated content key. Therefore, even if the storage medium is copied by an unauthorized user, decryption of the encrypted content can be prevented.

Here, the semiconductor memory may perform mutual device authentication with the rental-shop apparatus, and only when the mutual device authentication succeeds, allow the rental-shop apparatus to write the right information. Also, the semiconductor memory may perform mutual device authentication with the reproduction apparatus, and only when the mutual device authentication succeeds, allow the reproduction apparatus to read the right information.

According to these constructions, the semiconductor memory and the reproduction apparatus perform mutual device authentication between each other. Therefore, only an authenticated device is allowed to use the right information.

Here, the area of the semiconductor memory may include a plurality of application areas that are provided in one-to-one correspondence with a plurality of application functions, where each application area is provided for securely storing information for the corresponding application function. One of the plurality of application functions may be a rental function of renting the storage medium for use in the storage-medium rental system, and the application area corresponding to the rental function is used to store the right information.

According to this construction, the area of the semiconductor memory includes a plurality of application areas that are provided in one-to-one correspondence with the a plurality of application functions for securely storing information. Therefore, the semiconductor memory can be used for various purposes.

Here, another one of the plurality of application functions may be a membership card function of identifying a member of a rental shop, and the application area corresponding to the membership card function may be used to store a member number that identifies the user.

According to this construction, one of the application areas in the semiconductor memory is used to store a member number that identifies the user. Therefore, the semiconductor memory can function as a membership card for identifying a member of the rental shop.

Here, another one of the plurality of application functions may be a bonus provision function of providing, from the rental agent to the user, point information as a bonus in accordance with use of the storage medium. The application area corresponding to the bonus provision function may be used to store point information which shows (indicates) a predetermined number of points that can be used to make a payment for reproduction of the digital work when the rental agent receives the payment from the user. The rental-shop apparatus may send a request to the semiconductor memory to deduct a number of points that are designated by the user from the predetermined number of points that are shown by the point information as a part or all of the payment, and the semiconductor memory may further include a payment unit that deducts the designated number of points from the predetermined number of points that are shown by the point information, as requested by the rental-shop apparatus.

According to this construction, the semiconductor memory can function as a bonus provision card for providing, from the rental agent to the user, point information as a bonus in accordance with use of the storage medium.

Here, the rental-shop apparatus may generate, when the rental agent receives the payment from the user, point information showing (indicating) a number of points in accordance with the payment to be received, and additionally write the generated point information into the application area of the semiconductor memory.

According to this construction, the rental-shop apparatus generates, when the rental agent receives the payment from the user, point information showing the number of points in accordance with the payment to be received, and writes the generated point information to the semiconductor memory. Therefore, the user can use point information that is stored in the semiconductor memory.

Here, another one of the plurality of application functions may be a payment function that is used to make the rental payment from the user to the rental agent, and the application area corresponding to the payment function may prestore electric money information showing (indicating) a predetermined amount of electric money that can be used instead of actual money. When the rental agent receives the payment from the user, the rental-shop apparatus may send a request to the semiconductor memory to deduct an amount of electric money corresponding to the payment from the predetermined amount of electric money that is shown by the electric money information, receive electric money information showing the amount of electric money corresponding to the payment from the semiconductor memory, and store the received electric money information. The semiconductor memory may further include a payment unit that transmits the electric money information showing the amount of electric money corresponding to the payment to the rental-shop apparatus as requested by the rental-shop apparatus, and deduct the amount of electric money corresponding to the payment from the predetermined amount of electric money that is shown by the electric money information that is stored in the application area.

According to this construction, when the rental agent receives the payment from the user, the rental-shop apparatus sends a request to the semiconductor memory to deduct an amount of electric money corresponding to the payment from the amount of electric money shown by the electric money information, and receives electric money information showing the amount of electric money corresponding to the payment from the semiconductor memory. Therefore, the user and the rental agent do not need to handle actual money.

Here, another one of the plurality of application functions may be a payment function that is used to make a rental payment from the user to the rental agent, and the application area corresponding to the payment function may prestore electric ticket information that shows electric tickets that can be used to make a payment for reproduction of the digital work when the digital work is reproduced. The reproduction apparatus may send a request to the semiconductor memory to deduct electric tickets corresponding to the payment that is determined in accordance with the reproduction of the digital work from the electric tickets that are shown by the electric ticket information, and the semiconductor memory may further include a payment unit that deducts the electric tickets corresponding to the payment from the electric tickets that are shown by the electric ticket information stored in the application area, as requested by the reproduction apparatus.

According to this construction, when reproducing the digital work, the reproduction apparatus sends a request to the semiconductor memory to deduct electric tickets corresponding to the payment that is determined in accordance with reproduction of the digital work from the electric tickets that are shown by the electric ticket information. Therefore, the user does not need to handle actual money at the time of reproduction, and the payment can be made in accordance with the reproduction.

Here, the reproduction apparatus may obtain, before reproducing the digital work, electric ticket information showing remaining electric tickets from the semiconductor memory, and judge whether the digital work is not allowed to be used and prohibit the digital work from being reproduced when the remaining electric tickets are less than the electric tickets corresponding to the payment that is determined in accordance with the reproduction of the digital work.

According to this construction, before reproducing the digital work, the reproduction apparatus can judge whether the digital work is allowed to be reproduced or not based on the remaining electric tickets that are shown by the electric ticket information stored in the semiconductor memory. Therefore, such a case can be avoided where the digital work is allowed to be reproduced although the remaining electric tickets are less than the required electric tickets.

Here, the reproduction apparatus may send a request to the semiconductor memory to deduct electric tickets corresponding to a payment for a one-time reproduction from the electric tickets that are shown by the electric ticket information, every time the digital work is reproduced.

According to this construction, the reproduction apparatus sends a request to the semiconductor memory to deduct electric tickets corresponding to a payment for reproduction of one-time from the electric tickets shown by the electric ticket information every time the digital work is reproduced. Therefore, the user can make a payment in accordance with the number of times the digital work is reproduced.

Here, when reproducing the digital work one or more times during a predetermined period of time, the reproduction apparatus may send a request to the semiconductor memory to deduct electric tickets corresponding to a payment for the reproduction of the digital work during the predetermined period of time from the electric tickets that are shown by the electric ticket information.

According to this construction, when reproducing the digital work is reproduced one or more times during a predetermined period of time, the reproduction apparatus sends a request to the semiconductor memory to deduct electric tickets corresponding to a payment for the reproduction of the digital work during the predetermined period of time from the electric tickets shown by the electric ticket information. Therefore, the user can make a payment in accordance with the number of times the digital work is reproduced.

BRIEF DESCRIPTION OF THE DRAWINGS

These and other objects, advantages and features of the present invention will become more apparent from the following description when taken in conjunction with the accompanying drawings which illustrate specific embodiments of the present invention.

In the drawings:

FIG. 3 shows one example of a data structure of a rental-shop membership table 151;

FIG. 4 shows one example of a data structure of a rental-use management table 152;

DETAILED DESCRIPTION OF THE INVENTION

1. FIRST EMBODIMENT

The following describes a rental system 1 as a first embodiment of the present invention.

1.1 Construction of the Rental System 1

Figure 1:
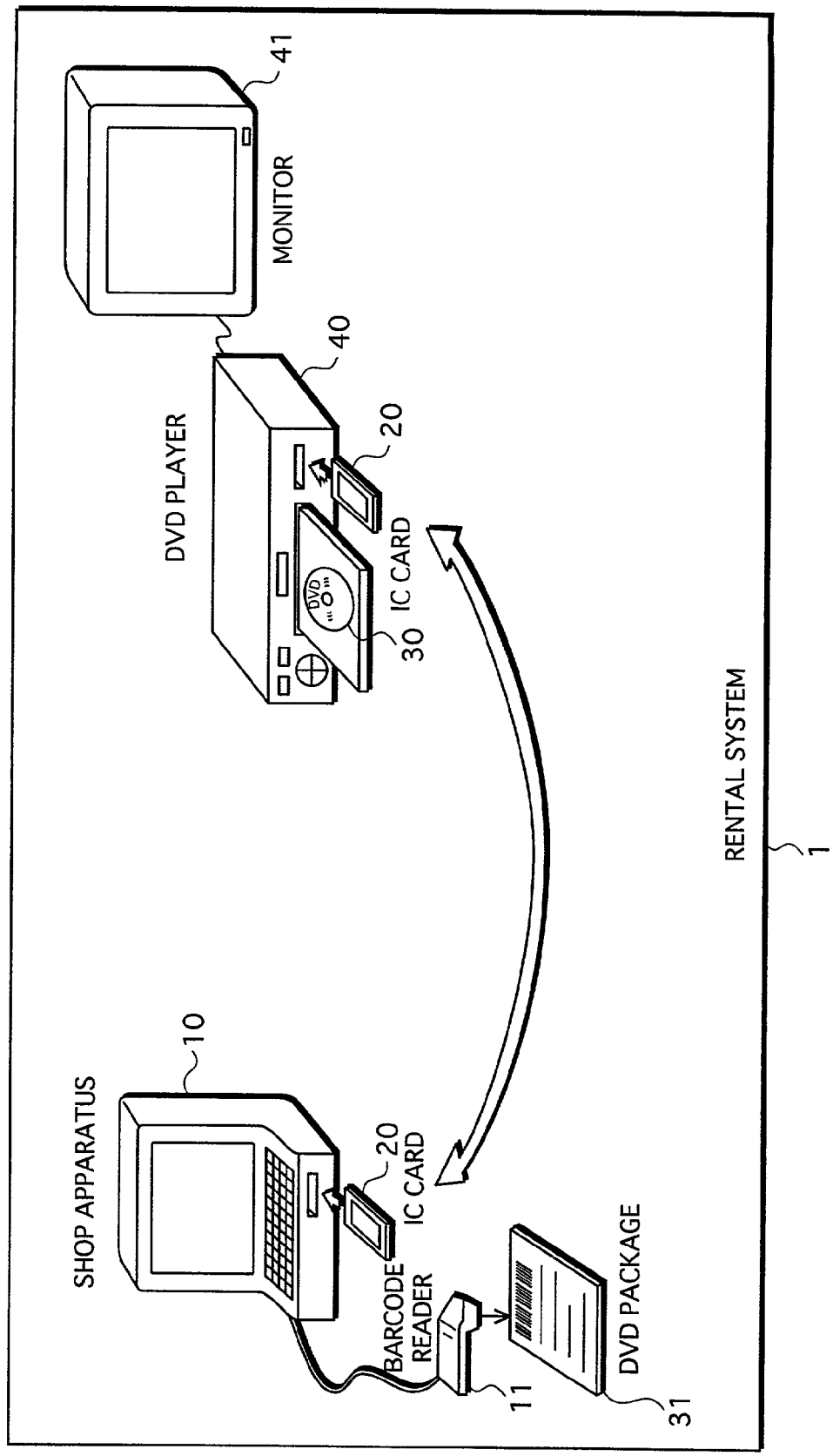
FIG. 1 shows the construction of a rental system 1.

As shown in FIG. 1, the rental system 1 is roughly composed of a shop apparatus 10, an IC card 20, a DVD 30, and a DVD player 40.

The shop apparatus 10 is located at a shop that is run by a rental agent, and the operations of the shop apparatus 10 are managed by the rental agent. When the rental agent rents the DVD (Digital Versatile Disc) 30 storing digital work such as a movie and music to a user, the IC card 20 owned by the user is mounted on (or inserted into) the shop apparatus 10. The shop apparatus 10 writes rental-use management information, which is described later, to the IC card 20 owned by the user.

The DVD player 40 is located at the user's home. To reproduce the digital work stored in the rented DVD 30, the user mounts (inserts) the DVD 30 and the IC card 20 on (onto) the DVD player 40. The DVD player 40 judges (determines) whether the digital work stored on the DVD 30 is allowed to be reproduced or not based on the rental-use management information stored in the IC card 20. When the DVD player 40 judges that the digital work is allowed to be reproduced, the DVD player 40 reproduces the digital work.

The following describes each component of the rental system 1.

1.1.1 Construction of the DVD 30

The DVD 30 is an optical magnetic disc that can store high-volume information. As shown in FIG. 1, the DVD 30 is wrapped in a DVD package 31. A barcode is printed on the surface of the DVD package 31. The barcode indicates, for example, a title ID that is described later.

Figure 6:
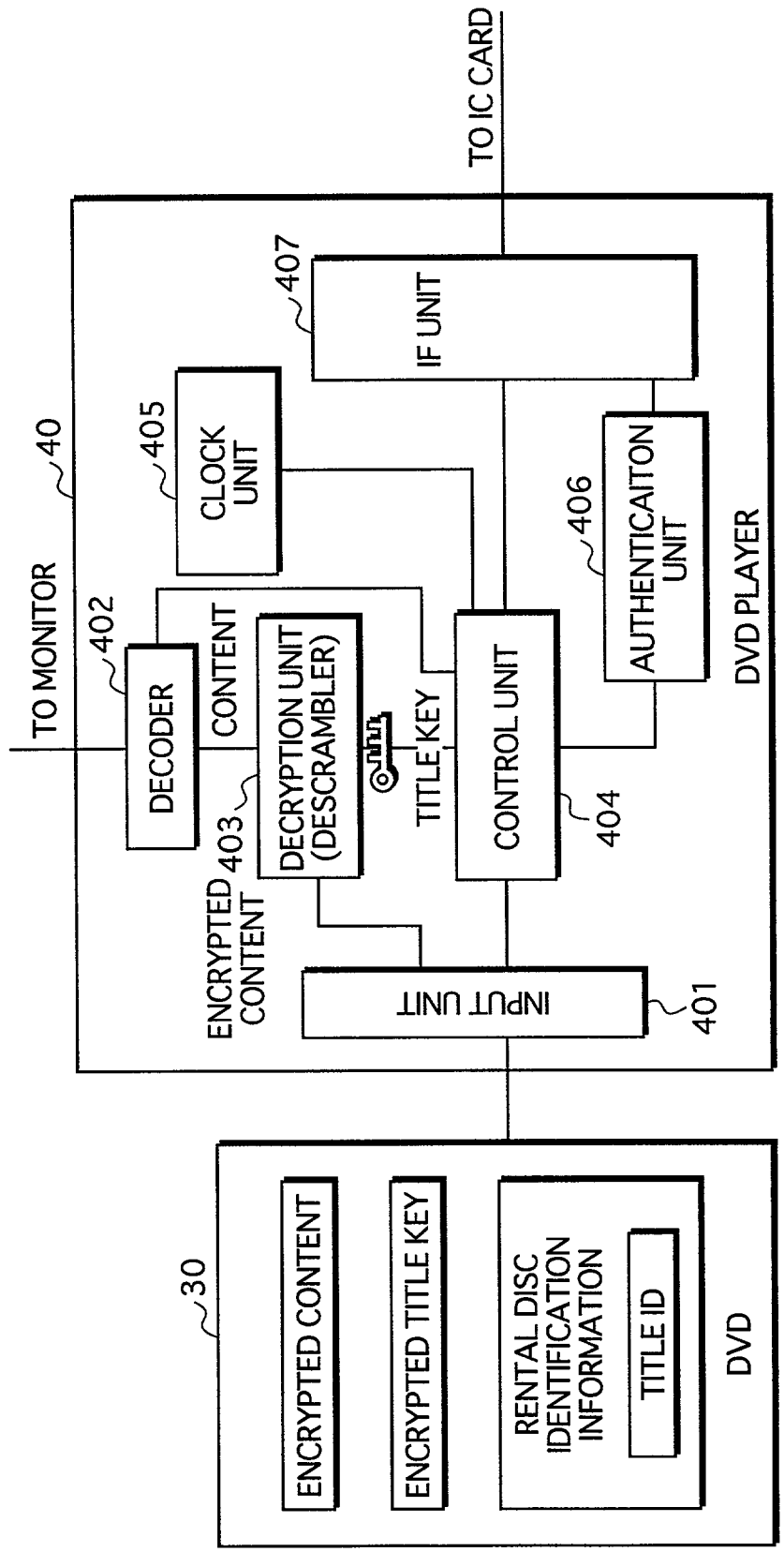
FIG. 6 is a block diagram showing the construction of a DVD player 40.

As one example shown in FIG. 6, the DVD 30 prestores encrypted content, an encrypted title key, and rental disc identification information.

The encrypted content is generated by encrypting content that is digital work, i.e., a movie, by using a title key. The title key that is used to encrypt the content is unique to the content. Here, DES (Data Encryption Standard) is used as an encryption algorithm.

The encrypted title key is generated by encrypting the title key by using a device key which is described later. Here, too, DES is used as an encryption algorithm.

The rental disc identification information shows that the DVD 30 is a disc which is available for rental. Also, the rental disc identification information includes a title ID. Here, the title ID is identification information for identifying the original content of the encrypted content which is stored on the DVD 30.

1.1.2 Construction of the Shop Apparatus 10

Figure 2:
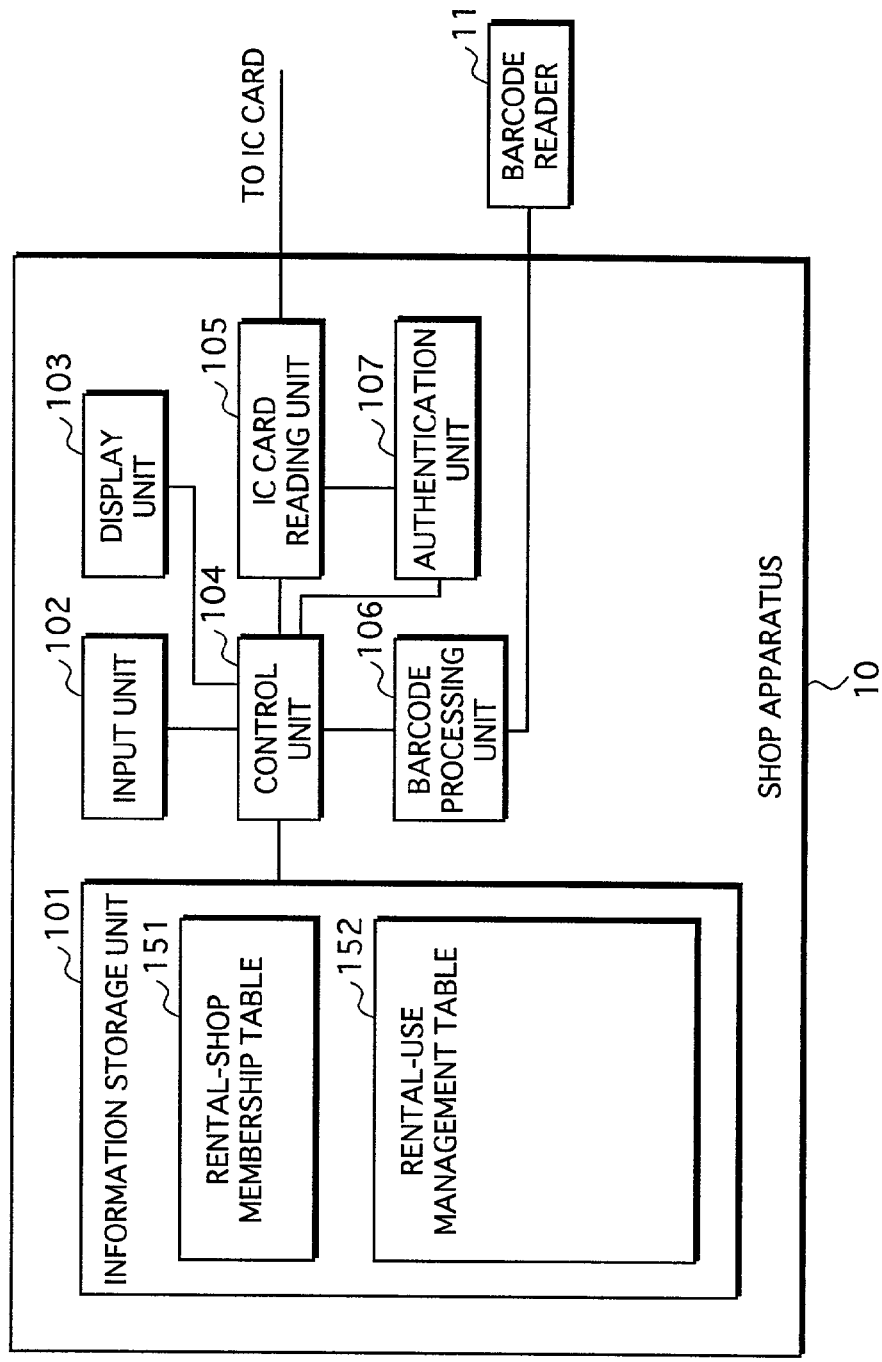
FIG. 2 is a block diagram showing the construction of a shop apparatus 10.

As shown in FIG. 2, the shop apparatus 10 is roughly composed of an information storage unit 101, an input unit 102, a display unit 103, a control unit 104, an IC card reading unit 105, a barcode processing unit 106, and an authentication unit 107. Also, a barcode reader 11 is connected to the shop apparatus 10.

Specifically, the shop apparatus 10 is a computer system that is roughly composed of a microprocessor, a ROM, a RAM, a hard disk unit, a display unit, and a keyboard. The hard disk unit stores computer programs. The functions of the shop apparatus 10 are realized by the microprocessor operating in accordance with the computer programs.

(1) Information Storage Unit 101

As shown in FIG. 2, the information storage unit 101 includes a rental-shop membership table 151 and a rental-use management table 152.

(Rental-Shop Membership Table 151)

The rental-shop membership table 151 is for storing information corresponding to users who are registered as members of the rental shop run by the rental agent. As one example shown in FIG. 3, the rental-shop membership table 151 has an area for storing a plurality of sets of membership information.

Each set of membership information corresponds to one member.

A set of membership information is made up of a member number, a member name, an address, a birth date, and a telephone number. Here, the member number is an identification number for identifying the corresponding member. The member name is a full name of the member. The address is a location of residence of the member. The birth date is a date, month, and year when the member was born. The telephone number is a number of a telephone owned by the member.

(Rental-Use Management Table 152)

The rental-use management table 152 is for storing information pertaining to DVDs that are rented from the rental shop to the user. As one example shown in FIG. 4, the rental-use management table 152 includes a plurality of sets of use management information.

Each set of use management information corresponds to one rented DVD.

A set of use management information is made up of a title ID, a member number, a rental start date, a rental end date, and a rental price. Here, the title ID is identification information for identifying content that is stored on the corresponding DVD. The member number identifies a member to which the DVD is rented. The rental start date is a date when rental of the DVD is started. The rental end date is a date when the rental of the DVD is ended. The rental price shows an amount of payment for the DVD rental.

(2) Authentication Unit 107

The authentication unit 107 performs mutual device authentication with the IC card 20 via the IC card reading unit 105 when the IC card 20 is mounted on (inserted in) the shop apparatus 10. Here, the device authentication is of a challenge-response type. The device authentication is not described in detail here as it is well known.

The authentication unit 107 sends a success message indicating that the mutual device authentication was a success to the control unit 104 when the mutual device authentication between the authentication unit 107 and the IC card 20 succeeds, and the authentication unit 107 sends a failure message indicating that the mutual device authentication was a failure to the control unit 104 when the mutual device authentication fails.

When the mutual device authentication fails, the shop apparatus 10 thereafter does not transmit and receive information to and from the IC card 20.

(3) IC Card Reading Unit 105

The IC card reading unit 105 bidirectionally transmits and receives information between the control unit 104 and the IC card 20 under the control of the control unit 104, and the IC card reading unit 105 bidirectionally transmits and receives information between the authentication unit 107 and the IC card 20 under the control of the authentication unit 107.

(4) Barcode Reader 11

The barcode reader 11 optically reads a barcode that is printed on the surface of the DVD package 31, generates read-information corresponding to the barcode, and outputs the generated read-information to the barcode processing unit 106.

(5) Barcode Processing Unit 106

The barcode processing unit 106 receives the read-information from the barcode reader 11, generates a title ID by using the received read-information, and outputs the generated title ID to the control unit 104.

(6) Control Unit 104

(Member Number Issuing Process)

The following describes a process of issuing a member number. In the member number issuing process, when an authentication performed by the authentication unit 107 in the shop apparatus 10 succeeds and an authentication performed by an authentication unit 204 in the IC card 20 succeeds, the control unit 104 receives a member name, an address, a birth date, and a telephone number from the input unit 102. Also, the control unit 104 newly generates a member number. Following this, the control unit 104 additionally writes a set of membership information that is made up of the generated member number and the received member name, address, birth date, and telephone number to the rental-shop membership table 151 held by the information storage unit 101.

Also, the control unit 104 outputs the generated member number to the IC card 20 via the IC card reading unit 105.

(DVD Rental Process)

The following describes a process of renting a DVD. In the DVD rental process, the control unit 104 receives a title ID from the barcode processing unit 106.

When an authentication performed by the authentication unit 107 in the shop apparatus 10 succeeds and an authentication performed by the authentication unit 204 in the IC card 20 succeeds, the control unit 104 outputs a request to read a member number to the IC card 20 via the IC card reading unit 105. The control unit 104 receives the member number from the IC card 20 via the IC card reading unit 105.

Following this, the control unit 104 sets a rental start date, a rental end date, and a rental price. Here, the rental start date is the present date, and the rental end date is a date seven days after the rental start date. Also, the rental price is a predetermined value. It should be noted here that the rental end date may be set variably as requested by the user. It should also be noted here that the rental price may be set in accordance with a rental period, or the rental price may be set in accordance with a type of digital work to be rented.

Following this, the control unit 104 generates a set of use management information that is made up of the generated title ID that is read by the barcode reader 11, the received member number, the set rental start date, rental end date and rental price, and the control unit 104 additionally writes the generated set of use management information to the rental-use management table 152 held by the information storage unit 101.

Also, the control unit 104 outputs the title ID and the rental end date to the IC card 20 via the IC card reading unit 105.

(7) Input Unit 102 and Display Unit 103

The input unit 102 receives an input from an operator of the shop apparatus 10, and outputs the received input to the control unit 104. Also, the display unit 103 receives information to be displayed from the control unit 104, and displays the received information.

1.1.3 Construction of the IC Card 20

The IC card 20 is provided to the user as being bundled with the DVD player 40.

Figure 5:
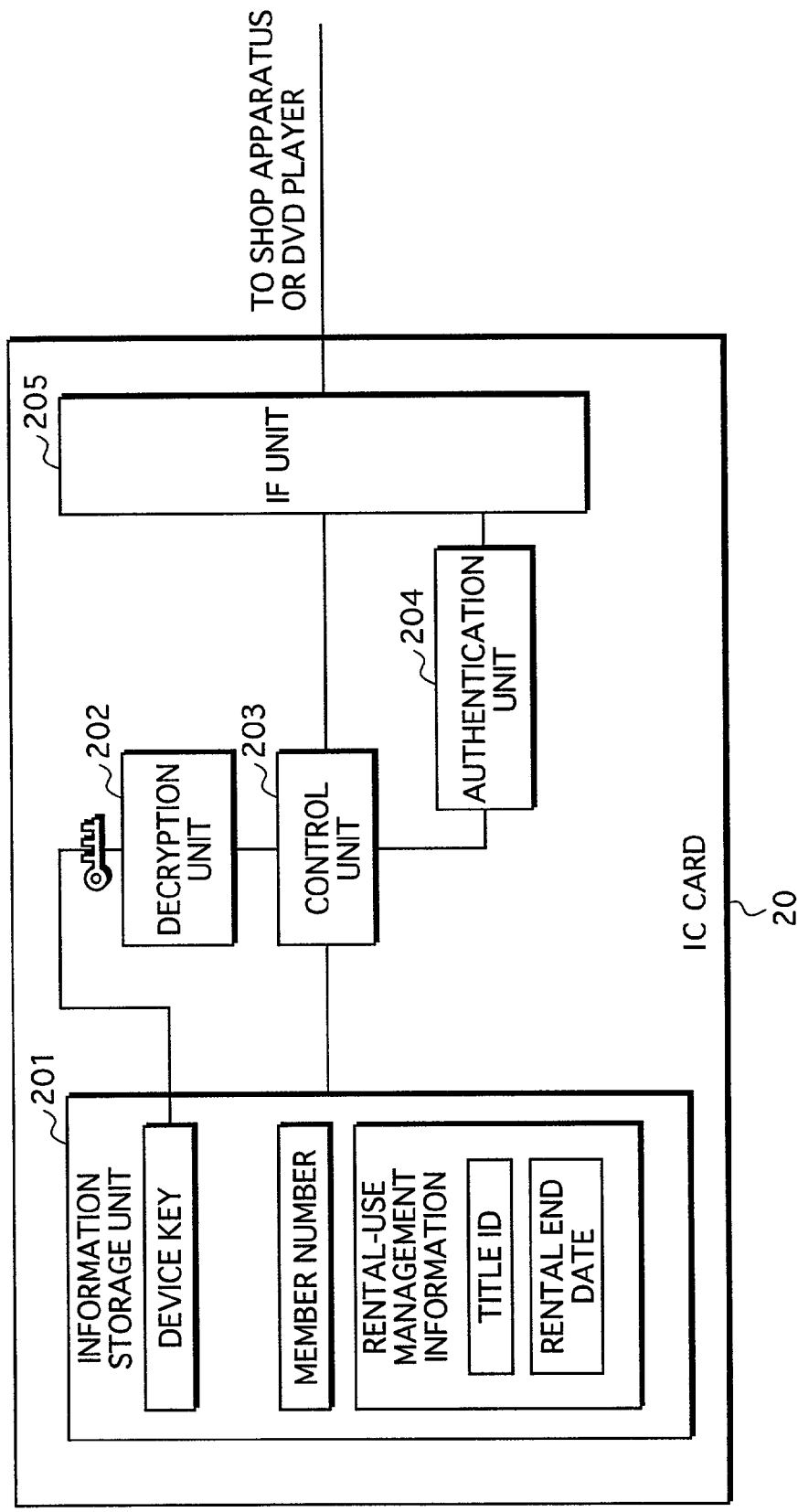
FIG. 5 is a block diagram showing the construction of an IC card 20.

As shown in FIG. 5, the IC card 20 is roughly composed of an information storage unit 201, a decryption unit 202, a control unit 203, the authentication unit 204 and an IF unit 205.

It should be noted here that each block is connected to another block by a connection line in FIG. 5. Here, each connection line indicates a path on which signals and information are transmitted. Also, a connection line with a drawing of a key, out of a plurality of connection lines connecting a block of the decryption unit 202 to other blocks, indicates a path on which information as a key is transmitted to the decryption unit 202. The same applies to the other drawings herein.

Specifically, the IC card 20 is a computer system that is roughly composed of a microprocessor, a ROM, and a RAM. The RAM stores computer programs. The functions of the IC card 20 are realized by the microprocessor operating in accordance with the computer programs.

The following describes each component of the IC card 20.

(1) Information Storage Unit 201

The information storage unit 201 prestores a device key. The device key is unique to the IC card 20 and has been written by a manufacturer when the IC card 20 is manufactured.

A DVD disc including a title key that is encrypted by using this device key is available for rental to the user at the rental shop.

It should be noted here that a producer of a DVD disc, more specifically a copyright-protected licenser, manages values of all the device keys. The copyright-protected licenser distributes these device keys to the manufacturer of IC cards to be mounted on (or to communicate with) DVD players. A device key that is distributed from the copyright-protected licenser to the manufacturer in this way is written to an IC card by the manufacturer of the IC card.

As described above, such an IC card that includes a device key which is necessary for encrypting content is originally utilized in a copyright protection system, and is diverted to the rental system.

Also, the information storage unit 201 has an area for storing a member number and rental-use management information. Here, the member number is an identification number for identifying a user that is registered as a member. The rental-use management information is information corresponding to the use of a rented DVD, more specifically, information corresponding to the a title ID and a rental end date of the rented DVD.

(2) IF Unit 205

The IF unit 205 bidirectionally transmits and receives information between the control unit 203 and an external device on which the IC card 20 is mounted (communicates with) under the control of the control unit 203, and the IF unit 205 bidirectionally transmits information between the authentication unit 204 and an external device on which the IC card 20 is mounted (communicates with) under the control of the authentication unit 204. Here, an external device is the shop apparatus 10 or the DVD player 40.

(3) Authentication Unit 204

The authentication unit 204 performs mutual device authentication with the shop apparatus 10 via the IF unit 205 when the IC card 20 is mounted on (inserted into) the shop apparatus 10. Here, the device authentication is of a challenge-response type. The device authentication is not described in detail here as the device authentication is well known.

The authentication unit 204 sends a success message indicating that the mutual device authentication was a success to the control unit 203 when the mutual device authentication between the authentication unit 204 and the shop apparatus 10 succeeds, and the authentication unit 204 sends a failure message indicating that the mutual device authentication was a failure to the control unit 203 when the mutual device authentication fails.

When the mutual device authentication fails, the IC card 20 thereafter does not transmit and receive information to and from the shop apparatus 10.

Also, the authentication unit 204 performs mutual device authentication with the DVD player 40 via the IF unit 205 when the IC card 20 is mounted on (inserted into) the DVD player 40. Here, the device authentication is of a challenge-response type. The device authentication is not described in detail here as the device authentication is well known.

The authentication unit 204 sends a success message indicating that the mutual device authentication was a success to the control unit 203 when the mutual device authentication between the authentication unit 204 and the DVD player 40 succeeds, and the authentication unit 204 sends a failure message indicating that the mutual device authentication was a failure to the control unit 203 when the mutual device authentication fails.

When the mutual device authentication fails, the IC card 20 thereafter does not transmit and receive information to and from the DVD player 40.

(4) Decryption Unit 202

The decryption unit 202 receives an encrypted title key from the control unit 203, reads a device key from the information storage unit 201, decrypts the received encrypted title key by using the read device key so as to generate a title key, and outputs the generated title key to the control unit 203. Here, DES is used as a decryption algorithm.

(5) Control Unit 203

(Member Number Issuing Process)

To newly issue a member number, the control unit 203 receives a member number from the shop apparatus 10 via the IF unit 205, and writes the received member number to the information storage unit 201.

(DVD Rental Process)

To rent a DVD to a user who is a member of the rental shop, the control unit 203 receives a request to read a member number via the IF unit 205 when an authentication performed by the authentication unit 107 in the shop apparatus 10 succeeds and an authentication performed by the authentication unit 204 in the IC card 20 succeeds. Upon receipt of the request, the control unit 203 reads the member number from the information storage unit 201, and outputs the read member number to the shop apparatus 10 via the IF unit 205.

Also, the control unit 203 receives a title ID and a rental end date from the shop apparatus 10 via the IF unit 205. Following this, the control unit 203 writes rental-use management information including the received title ID and the rental end date to the information storage unit 201.

(DVD Data Reproduction Process)

The following describes a DVD data reproduction process in which the user to which the DVD 30 has been rented reproduces digital work which is stored on the DVD 30. In the DVD data reproduction process, the control unit 203 first receives rental disc identification information from the DVD player 40 via the IF unit 205 when an authentication performed by the authentication unit 406 in the DVD player 40 succeeds and when an authentication performed by the authentication unit 204 in the IC card 20 succeeds.

Following this, the control unit 203 reads a title ID included in rental-use management information from the information storage unit 201, and judges whether the title ID that is included in the received rental disc identification information and the read title ID match or not. When a result of this judgment is negative, the control unit 203 ends the process.

When the result of the above judgment is affirmative, the control unit 203 sends a request to obtain the present date and time to the DVD player 40 via the IF unit 205. Then, the control unit 203 receives the present date and time from the DVD player 40 via the IF unit 205.

Following this, the control unit 203 reads a rental end date that is included in the rental-use management information from the information storage unit 201, and compares the received present date and time and the read rental end date. When the control unit 203 judges that the present date and time is after the rental end date, the control unit 203 ends the process.

When the control unit 203 judges that the present date and time is before the rental end date or is on the rental end date, the control unit 203 sends a request to read an encrypted title key from the DVD 30 to the DVD player 40 via the IF unit 205. Then, the control unit 203 receives the encrypted title key from the DVD player 40 via the IF unit 205, and outputs the received encrypted title key to the decryption unit 202. The control unit 203 receives a title key from the decryption unit 202, and outputs the received title key to the DVD player 40 via the IF unit 205.

1.1.4 Construction of the DVD Player 40

As shown in FIG. 6, the DVD player 40 is roughly composed of an input unit 401, a decoder 402, a decryption unit 403, a control unit 404, a clock unit 405, the authentication unit 406, and an IF unit 407.

Specifically, the DVD player 40 is a computer system that is roughly composed of a microprocessor, a ROM, and a RAM. The ROM stores computer programs. The functions of the DVD player 40 are partially realized by the microprocessor operating in accordance with the computer programs.

(1) Input Unit 401

The input unit 401 reads information from the DVD 30 under the control of the control unit 404 or the decryption unit 403, and outputs the read information to the control unit 404 or the decryption unit 403.

(2) IF Unit 407

The IF unit 407 bidirectionally transmits and receives information between the control unit 404 and the IC card 20 under the control of the control unit 404, and the IF unit 407 bidirectionally transmits and receives the information between the authentication unit 406 and the IC card 20 under the control of the authentication unit 406.

(3) Authentication Unit 406

The authentication unit 406 performs mutual device authentication with the IC card 20 via the IF unit 407 when the IC card 20 is mounted on (inserted in) the DVD player 40. Here, the device authentication is of a challenge-response type. The device authentication is not described in detail here as the device authentication is well known.

The authentication unit 406 sends a success message indicating that the mutual device authentication was a success to the control unit 404 when the mutual device authentication between the authentication unit 406 and the IC card 20 succeeds, and the authentication unit 406 sends a failure message indicating that the mutual device authentication was a failure to the control unit 404 when the mutual device authentication fails.

When the mutual device authentication fails, the DVD player 40 thereafter does not transmit and receive information to and from the IC card 20.

(4) Clock Unit 405

The clock unit 405 clocks the present date and time, and outputs the present date and time to the control unit 404 as requested by the control unit 404.

(5) Decryption Unit 403

The decryption unit 403 receives a title key from the control unit 404, reads encrypted content from the DVD 30 via the input unit 401, decrypts the read encrypted content by using the received title key so as to generate content, and outputs the generated content to the decoder 402. Here, DES is used as a decryption algorithm.

(6) Decoder 402

The decoder 402 receives content from the decryption unit 403, reproduces the received content so as to generate video and audio signals, and outputs the generated video and audio signals to the monitor 41. The monitor 41 receives the video and audio signals, converts the video and audio signals into video and audio, and outputs the video and audio.

(7) Control Unit 404

The control unit 404 reads rental disc identification information from the DVD 30 via the input unit 401 and outputs the read rental disc identification information to the IC card 20 via the IF unit 407 when an authentication performed by the authentication unit 406 in the DVD player 40 succeeds and when an authentication performed by the authentication unit 204 in the IC card 20 succeeds.

Also, the control unit 404 receives a request to obtain the present date and time from the IC card 20 via the IF unit 407. Upon receipt of the request, the control unit 404 obtains the present date and time from the clock unit 405, and outputs the obtained present date and time to the IC card 20 via the IF unit 407.

Also, the control unit 404 receives a request to read an encrypted title key from the DVD 30 from the IC card 20 via the IF unit 407. Upon receipt of the request, the control unit 404 reads the encrypted title key from the DVD 30, and outputs the read encrypted title key to the IC card 20 via the IF unit 407.

Further, the control unit 404 receives the title key from the IC card 20 via the IF unit 407, and outputs the received title key to the decryption unit 403.

1.2 Operation of the Rental System 1

The following describes an operation of each of the member number issuing process, the DVD rental process, and the DVD data reproduction process in the rental system 1.

1.2.1 Member Number Issuing Process

Figure 7:
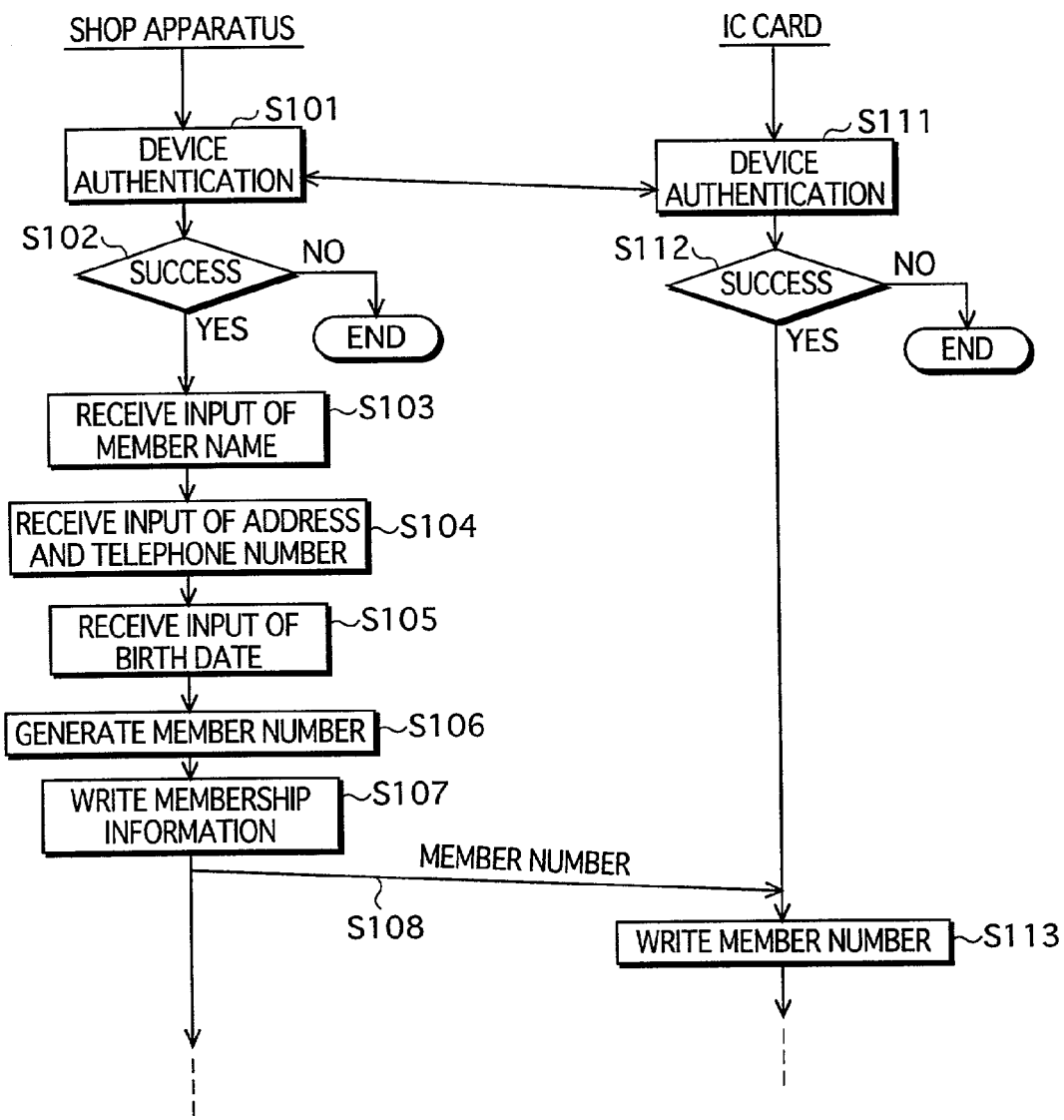
FIG. 7 is a flowchart showing an operation that is performed when a member number is newly issued.

With reference to a flowchart shown in FIG. 7, the following describes an operation that is performed when a member number is newly issued.

A shop clerk who operates the shop apparatus 10 at the rental shop receives the IC card 20 from a user who wants to newly register as a member of the rental shop, and mounts (inserts) the received IC card 20 on (into) the shop apparatus 10.

When the IC card 20 is mounted on (inserted into) the shop apparatus 10 by the operator of the shop apparatus 10, the authentication unit 107 in the shop apparatus 10 performs an authentication of the authentication unit 204 in the IC card 20 (step S101), and when the authentication unit 204 in the IC card 20 performs an authentication of the authentication unit 107 in the shop apparatus 10 (step S111).

When the authentication performed by the authentication unit 107 in the shop apparatus 10 fails (step S102), the shop apparatus 10 thereafter stops processing relating to the IC card 20 and ends the member number issuing process. Also, when the authentication performed by the authentication unit 204 in the IC card 20 fails (step S112), the IC card 20 stops processing relating to the shop apparatus 10.

When the authentication performed by the authentication unit 107 in the shop apparatus 10 succeeds (step S102), and when the authentication performed by the authentication unit 204 in the IC card 20 succeeds (step S112), the input unit 102 receives an input of a member name, outputs the input member name to the control unit 104 (step S103), receives an input of an address and a telephone number, outputs the input address and telephone number to the control unit 104 (step S104), receives an input of a birth date, and outputs the input birth date to the control unit 104 (step S105). Following this, the control unit 104 generates a new member number (step S106), and writes a set of membership information, which is made up of the generated member number and the received member name, address, birth date and telephone number, to the rental-shop membership table 151 which is held by the information storage unit 101 (step S107).

Following this, the control unit 104 outputs the generated member number to the IC card 20 via the IC card reading unit 105, and the control unit 203 in the IC card 20 receives the member number via the IF unit 205 (step S108). The control unit 203 writes the received member number to the information storage unit 201 (step S113).

As described above, a set of membership information for the user who has newly become a member is registered in the shop apparatus 10, and the user's member number is stored into the IC card 20 that is owned by the user.

1.2.2 DVD Rental Process

Figure 8:
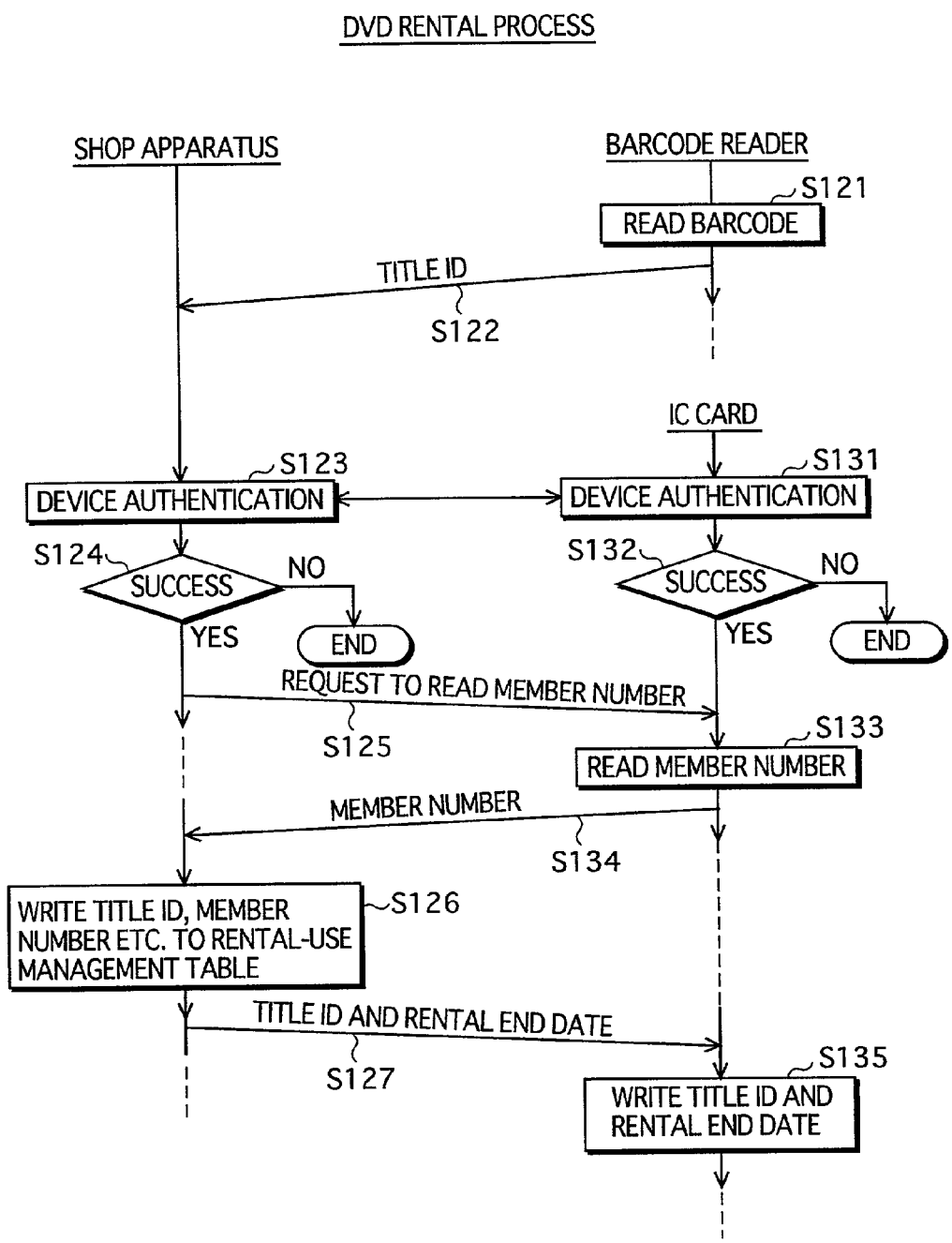
FIG. 8 is a flowchart showing an operation that is performed when a DVD is rented to a user who is a member of a rental shop.

With reference to a flowchart shown in FIG. 8, the following describes an operation that is performed when a DVD is rented to a user who is a member of the rental shop.

A shop clerk who operates the shop apparatus 10 at the rental shop operates the barcode reader 11 so as to optically read a barcode that is printed on the surface of the DVD package 31.

The barcode reader 11 which is connected to the shop apparatus 10 optically reads the barcode that is printed on the surface of the DVD package 31, and generates read-information corresponding to the read barcode (step S121). The barcode processing unit 106 receives the read-information from the barcode reader 11, generates a title ID by using the received read-information, and outputs the generated title ID to the control unit 104 (step S122).

Following this, the shop clerk who operates the shop apparatus 10 receives the IC card 20 from the user who is a member of the rental shop, and mounts (inserts) the received IC card 20 on (in) the shop apparatus 10.

When the IC card 20 is mounted on (inserted in) the shop apparatus 10 by the operator of the shop apparatus 10, the authentication unit 107 in the shop apparatus 10 performs an authentication of the authentication unit 204 in the IC card 20 (step S123), and the authentication unit 204 in the IC card 20 performs an authentication of the authentication unit 107 in the shop apparatus 10 (step S131).

When the authentication performed by the authentication unit 107 in the shop apparatus 10 fails (step S124), the shop apparatus 10 thereafter stops processing relating to the IC card 20 and ends the DVD rental process. Also, when the authentication performed by the authentication unit 204 in the IC card 20 fails (step S132), the IC card 20 stops processing relating to the shop apparatus 10.

When the authentication performed by the authentication unit 107 in the shop apparatus 10 succeeds (step S124) and when the authentication performed by the authentication unit 204 in the IC card 20 succeeds (step S132), the control unit 104 outputs a request to read a member number to the IC card 20 via the IC card reading unit 105, and the control unit 203 receives the request to read the member number via the IF unit 205 (step S125). Upon receipt of the request to read the member number, the control unit 203 reads the member number from the information storage unit 201 (step S133), and outputs the read member number to the shop apparatus 10 via the IF unit 205. The control unit 104 receives the member number via the IC card reading unit 105 (step S134).

Following this, the control unit 104 sets a rental start date, a rental end date, and a rental price, generates a set of use management information, which is made up of the generated title ID read by the barcode reader 11, the received member number, and the set rental start date, rental end date and rental price, and additionally writes the generated set of use management information to the rental-use management table 152 which is held by the information storage unit 101 (step S126). Following this, the control unit 104 outputs the title ID and the rental end date to the IC card 20 via the IC card reading unit 105. The control unit 203 receives the title ID and the rental end date via the IF unit 205 (step S127). Then, the control unit 203 writes rental-use management information including the received title ID and rental end date to the information storage unit 201 (step S135).

As described above, rental-use management information relating to the DVD 30 to be rented to the user is written to the IC card 20 that is owned by the user.

1.2.3 DVD Data Reproduction Process

Figure 9:
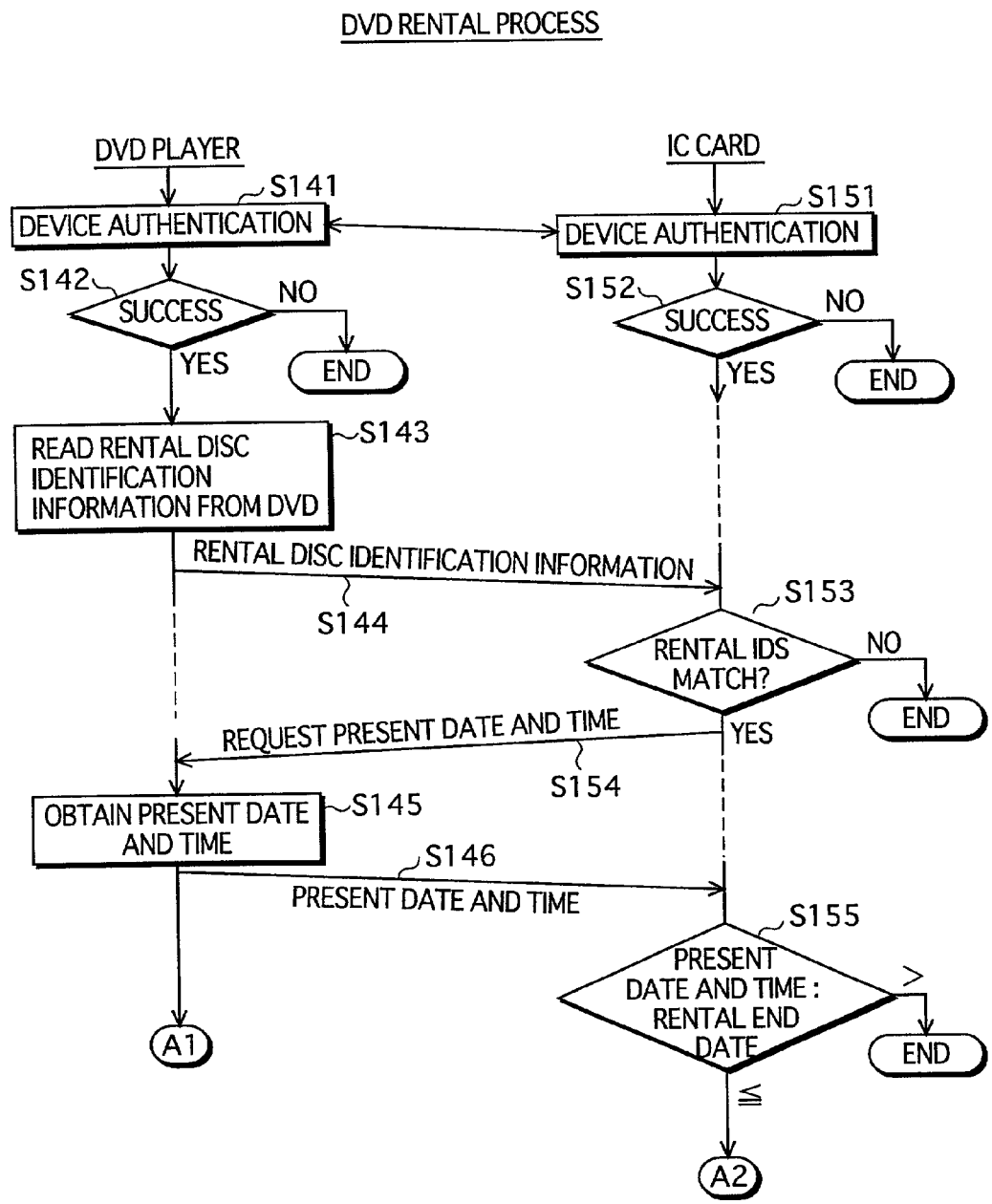
FIG. 9 is a flowchart showing an operation that is performed when digital work which is stored on a DVD 30 is reproduced by the DVD player, continuing to FIG. 10.
Figure 10:
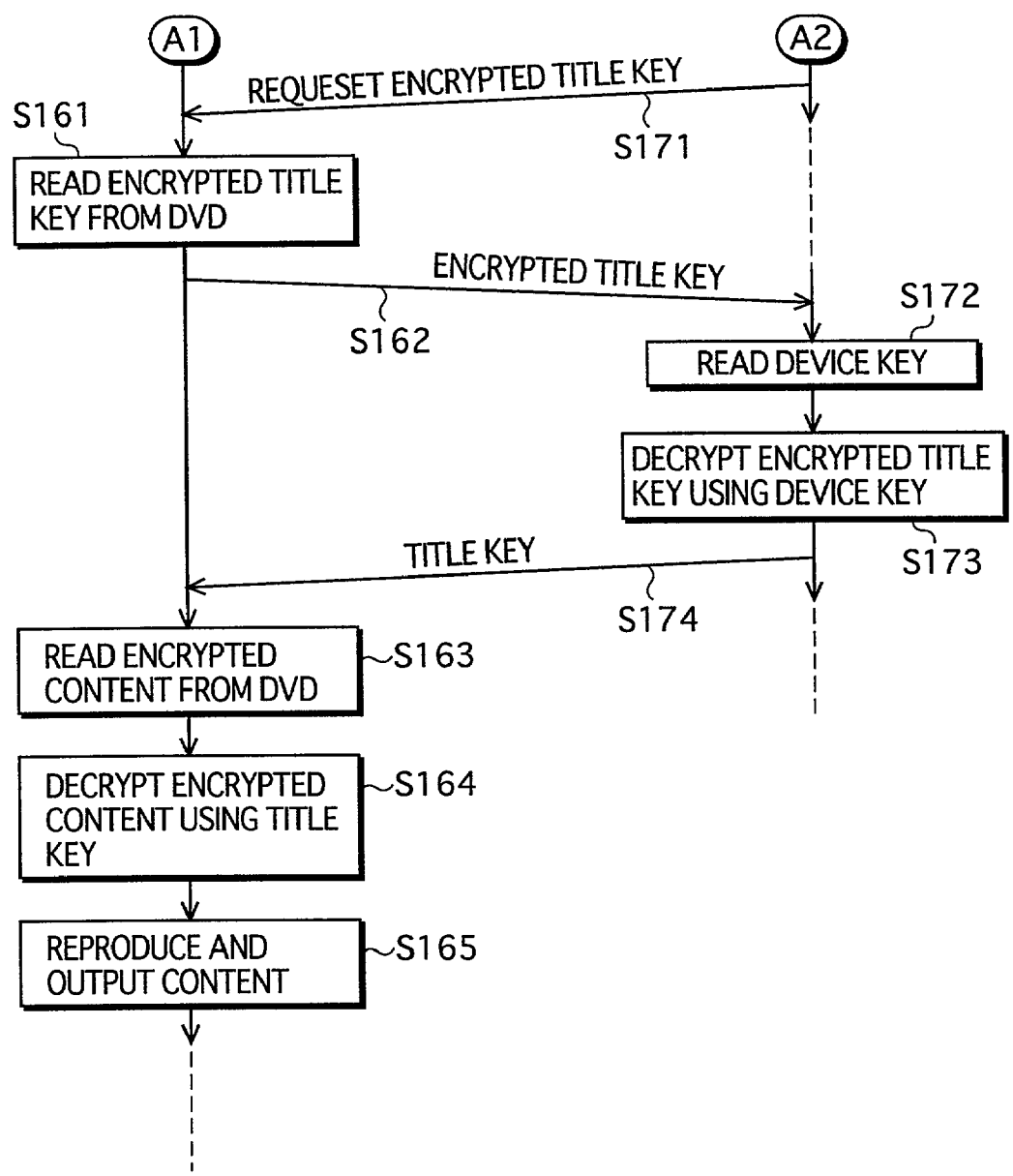
FIG. 10, continuing from FIG. 9, is a flowchart showing the operation performed when the digital work stored on the DVD 30 is reproduced by the DVD player.

With reference to flowcharts shown in FIGS. 9 and 10, the following describes an operation that is performed when the user to which the DVD 30 has been rented reproduces digital work stored in the DVD 30.

The user to which the DVD 30 has been rented mounts (inserts) the DVD 30 and the IC card 20 on (into) the DVD player 40.

When the IC card 20 is mounted on (inserted into) the DVD player 40 by the user, the authentication unit 406 in the DVD player 40 performs an authentication of the authentication unit 204 in the IC card 20 (step S141), and the authentication unit 204 in the IC card 20 performs an authentication of the authentication unit 406 in the DVD player 40 (step S151).

When the authentication performed by the authentication unit 406 in the DVD player 40 fails (step S142), the DVD player 40 thereafter stops processing relating to the IC card 20 and ends the DVD data reproduction process. Also, when the authentication performed by the authentication unit 204 in the IC card 20 fails (step S152), the IC card 20 stops processing relating to the DVD player 40.

When the authentication performed by the authentication unit 406 in the DVD player 40 succeeds (step S142) and when the authentication performed by the authentication unit 204 in the IC card 20 succeeds (step S152), the control unit 404 reads rental disc identification information from the DVD 30 via the input unit 401 (step S143). The control unit 404 outputs the read rental disc identification information to the IC card 20 via the IF unit 407, and the control unit 203 receives the rental disc identification information via the IF unit 205 (step S144).

Following this, the control unit 203 reads a title ID that is included in rental-use management information from the information storage unit 201, and judges whether the title ID that is included in the received rental disc identification information and the read title ID match or not. When a result of this judgment is negative (step S153), the control unit 203 ends the process.

When the result of the above judgment is affirmative (step S153), the control unit 203 sends a request to obtain the present date and time to the DVD player 40 via the IF unit 205. The control unit 404 receives the request to obtain the present date and time via the IF unit 407 (step S154). The control unit 404 then obtains the present date and time from the clock unit 405 (step S145), and outputs the obtained present date and time to the IC card 20 via the IF unit 407. The control unit 203 receives the present date and time via the IF unit 205 (step S146).

Following this, the control unit 203 reads a rental end date that is included in the rental-use management information from the information storage unit 201, and compares the received present date and time with the read rental end date. When the control unit 203 judges that the present date and time is after the rental end date (step S155), the control unit 203 ends the process.

When the control unit 203 judges that the present date and time is before the rental end date or is on the rental end date (step S155), the control unit 203 sends a request to read an encrypted title key from the DVD 30 to the DVD player 40 via the IF unit 205. The control unit 404 of the DVD player 40 receives the request via the IF unit 407 (step S171). Then, the control unit 404 reads the encrypted title key from the DVD 30, and outputs the read encrypted title key to the IC card 20 via the IF unit 407. The control unit 203 receives the encrypted title key via the IF unit 205, and outputs the encrypted title key to the decryption unit 202 (step S162).

Following this, the decryption unit 202 reads a device key from the information storage unit 201 (step S172), and decrypts the received encrypted title key by using the read device key so as to generate a title key (step S173). The control unit 203 outputs the generated title key to the DVD player 40 via the IF unit 205, and the control unit 404 receives the title key via the IF unit 407 (step S174).

Following this, the control unit 404 outputs the received title key to the decryption unit 403 of the DVD player 40. The decryption unit 403 reads encrypted content from the DVD 30 via the input unit 401 (step S163), decrypts the read encrypted content by using the received title key so as to generate content, and outputs the generated content to the decoder 402 (step S164). The decoder 402 receives the content, and reproduces the received content so as to output video and audio signals to the monitor 41. The monitor 41 receives the video and audio signals and outputs the video and audio signals in the form of video and audio (step S165).

In the above-described operation, the user can reproduce digital work stored in the DVD 30.

1.3 Conclusions

As described above, in the storage-medium rental system of the first embodiment of the present invention, the rental agent rents a storage medium which stores digital work to the user so as to provide the digital work to the user.

To be more specific, the rental system is for temporarily providing a right (permission) to use the digital work which is stored on the storage medium from the rental agent to the user.

The rental system is roughly composed of a portable storage medium to be rented (specifically, a DVD), a portable semiconductor memory (an IC card), a shop apparatus, and a reproduction apparatus (a DVD player).

The portable storage medium prestores content information which represents digital work. The portable semiconductor memory has an area for securely storing information. The shop apparatus securely writes, into the area of the semiconductor memory, right information that shows a range of the right to use the digital work which is stored on the storage medium when the rental agent rents the storage medium to the user. Upon receipt of an instruction to reproduce the digital work from the user, the reproduction apparatus securely reads the right information from the area of the semiconductor memory, and judges whether the digital work is allowed to be used or not based on the read right information. Only when the reproduction apparatus judges that the digital work is allowed to be used, the reproduction apparatus reads the content information from the storage medium, and reproduces the digital work based on the read content information.

As can be known from the above, the IC card is an essential component for the reproduction apparatus to reproduce the content which is stored on the DVD. This can produce the following effect. Suppose that an unauthorized user with a malicious intention shoplifts a DVD disc that is displayed at the rental shop and brings the DVD home. In this case, the user cannot reproduce content which is stored on the DVD disc because the user's IC card does not store authenticated information.

Further, the DVD player may be equipped with only one reading unit for an IC card. This reading unit is originally provided to read and write information to and from an IC card for use in the copyright protection system. This reading unit can also read and write information to and from an IC card which is diverted to the rental system. Accordingly, the DVD player does not need to be newly equipped with another reading unit that is uniquely provided for an IC card used in the rental system.

Moreover, the rental shop can use a membership card also as a rental card, and thus, the operating cost relating to these cards can be reduced.

Also, the user does not have to carry a plurality of cards for these purposes.

2. SECOND EMBODIMENT

The following describes a rental system 1a (not shown) according to a second embodiment of the present invention which is a modification of the rental system 1 described above in the first embodiment.

2.1 Construction of the Rental System 1a

The rental system 1a is roughly composed of a shop apparatus 10, an IC card 20, a DVD 30, a DVD player 40, and a server apparatus 50.

The shop apparatus 10, the IC card 20, the DVD 30, and the DVD player 40 in the rental system 1a respectively have the same constructions as the shop apparatus 10, the IC card 20, the DVD 30, and the DVD player 40 as in the rental system 1 of the first embodiment. Accordingly, the same reference numerals used to describe the constituent elements of the rental system 1 of the first embodiment are also used hereinafter, and it is to be understood that the same elements have the same constituents and perform the same functions as those of the first embodiment unless otherwise indicated.

The following describes the rental system 1a in the second embodiment, focusing primarily on the differences between the rental system 1a of the second embodiment and the rental system 1 of the first embodiment.

2.1.1 DVD 30

Figure 12:
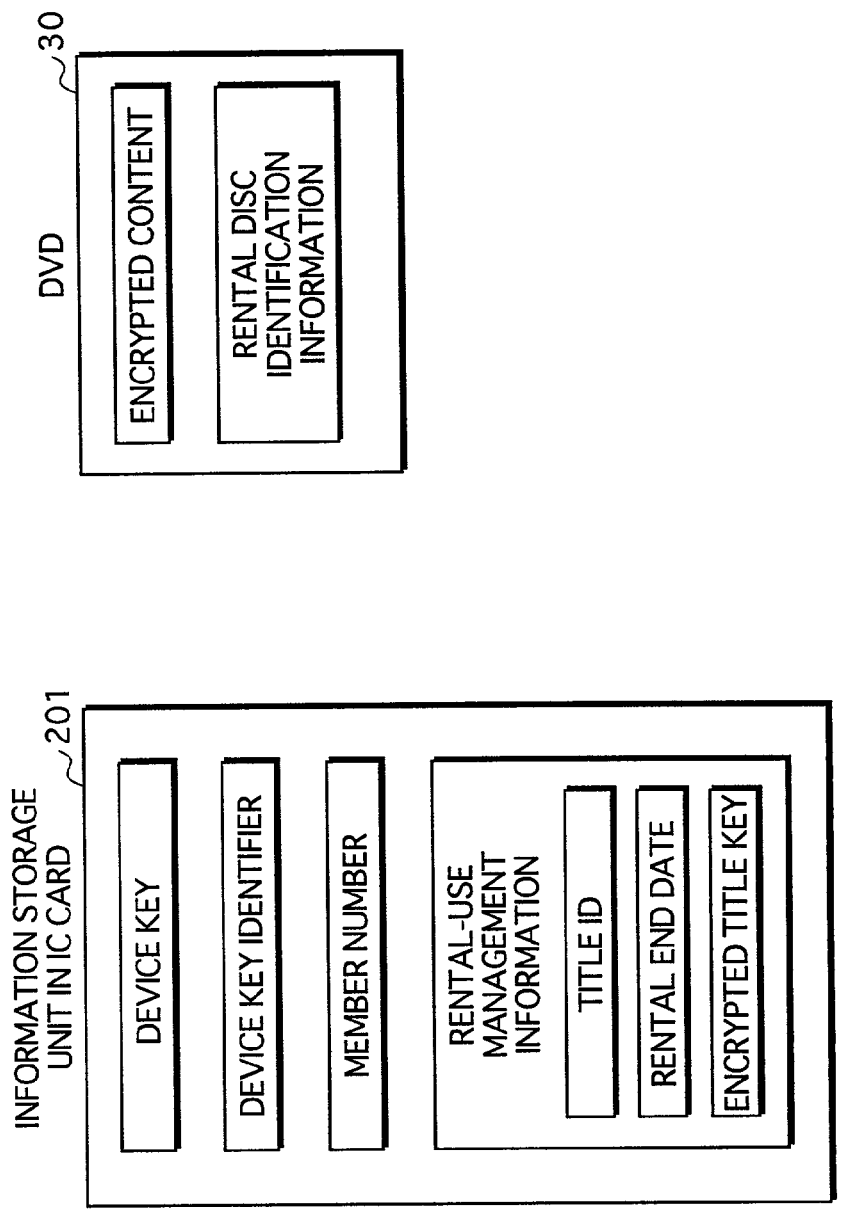
FIG. 12 shows one example of data stored in an information storage unit 201 which is included in the IC card 20, and one example of data which is stored on the DVD 30.

As shown in FIG. 12, the DVD 30 prestores encrypted content and rental disc identification information.

The DVD 30 in the second embodiment differs from the DVD 30 in the first embodiment in that the DVD 30 does not store an encrypted title key.

2.1.2 Server Apparatus 50

Figure 11:
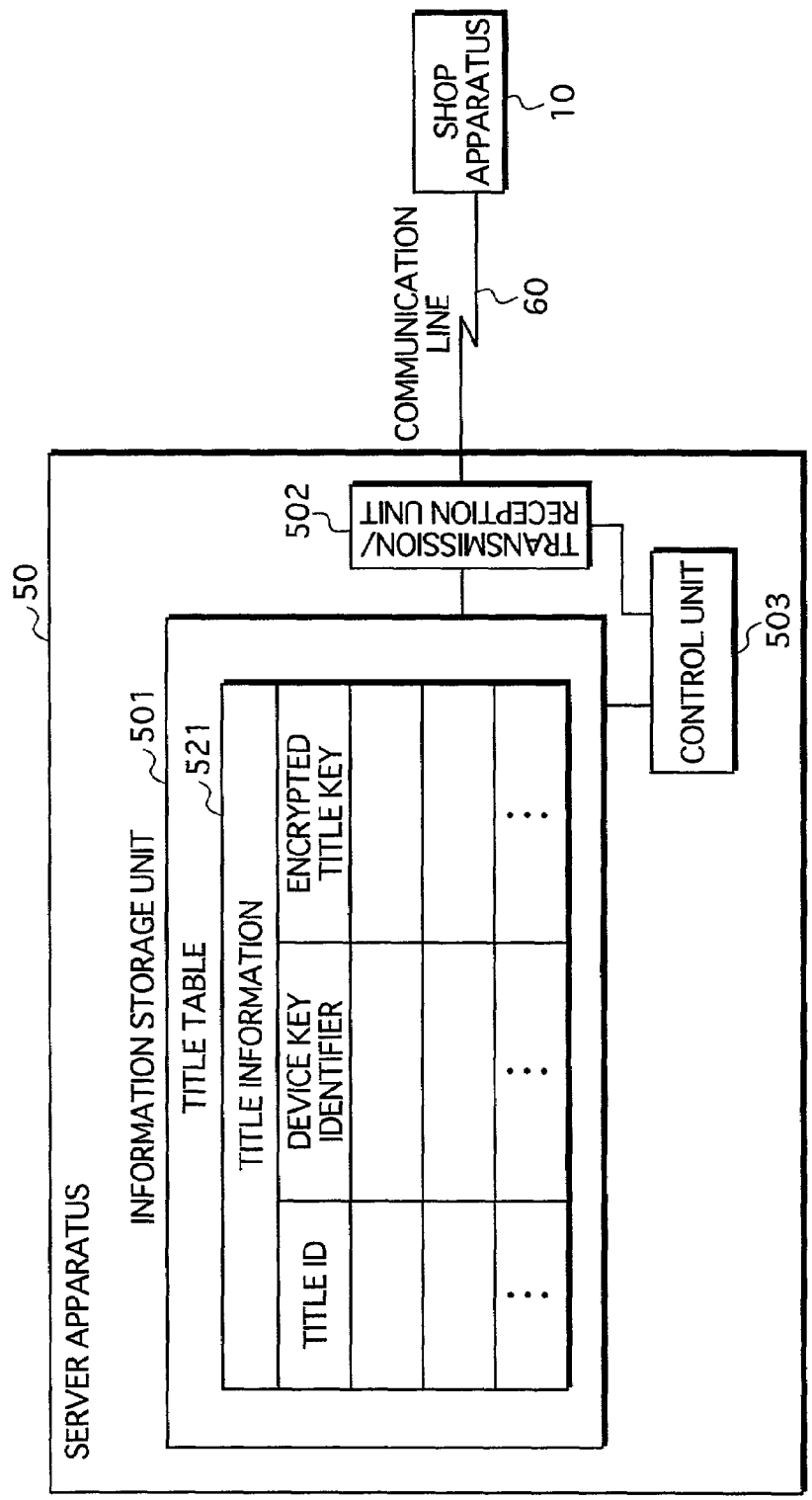
FIG. 11 is a block diagram showing the construction of a server apparatus 50.

As shown in FIG. 11, the server apparatus 50 is roughly composed of an information storage unit 501, a transmission/reception unit 502, a control unit 503, and a display unit and an input unit that are not shown. The server apparatus 50 is connected to the shop apparatus 10 via a communication line 60.

Specifically, the server apparatus 50 is a computer system that is roughly composed of a microprocessor, a ROM, a RAM, a hard disk unit, a display unit, a keyboard, a mouse, and a communication-line connecting unit. The hard disk unit stores computer programs. The functions of the server apparatus 50 are realized by the microprocessor operating in accordance with the computer programs.

(1) Information Storage Unit 501

As one example shown in FIG. 11, the information storage unit 501 stores a title table 521.

The title table 521 includes a plurality of sets of title information, each of which is made up of a title ID, a device key identifier, and an encrypted title key.

The title ID is identification information for identifying content that is digital work which is stored on the DVD 30.

The device key identifier is identification information for identifying a device key which is stored in the information storage unit 201 in the IC card 20.

The encrypted title key is generated by encrypting a title key by using a device key which is identified by the device key identifier. Here, the title key is used to encrypt content i.e., digital work, which is identified by the title ID.

(2) Control Unit 503

The control unit 503 receives a request to obtain an encrypted title key from the shop apparatus 10 via the communication line 60 and the reception/transmission unit 502. The control unit 503 further receives a title ID and a device key identifier.

Upon receipt of the request, the control unit 503 reads an encrypted title key corresponding to the received title ID and device key identifier from the title table 521 that is held by the information storage unit 501. Following this, the control unit 503 outputs the read encrypted title key to the shop apparatus 10 via the transmission/reception unit 502 and the communication line 60.

(3) Transmission/Reception Unit 502

The transmission/reception unit 502 is connected to the shop apparatus 10 via the communication line 60. The transmission/reception unit 502 transmits and receives information between the control unit 503 and the shop apparatus 10 via the communication line 60.

2.1.3 IC Card 20

(1) Information Storage Unit 201

As shown in FIG. 12, the information storage unit 201 prestores a device key identifier for identifying a device key in addition to the information the information storage unit 201 prestores as in the first embodiment. The device key identifier has been written thereto by the manufacturer the IC card 20 is manufactured.

(2) Control Unit 203

In the DVD rental process, the control unit 203 receives a request to obtain a device key identifier from the shop apparatus 10 via the IF unit 205. Upon receipt of the request, the control unit 203 reads the device key identifier from the information storage unit 201, and outputs the read device key identifier to the shop apparatus 10 via the IF unit 205.

Also, in the DVD rental process, the control unit 203 receives an encrypted title key as one item of rental-use management information from the shop apparatus 10 via the IF unit 205, and the control unit 203 writes the received encrypted title key to the information storage unit 201 as one item of the rental-use management information.

Further, in the DVD data reproduction process, the control unit 203 reads an encrypted title key from the rental-use management information stored in the information storage unit 201. The control unit 203 decrypts the read encrypted title key by using the device key read from the information storage unit 201 so as to generate a title key.

The control unit 203 in the first embodiment obtains the encrypted title key from the DVD 30 via the DVD player 40. In contrast to the first embodiment, however, the control unit 203 in the second embodiment reads the encrypted title key from the information storage unit 201.

2.1.4 Shop Apparatus 10

(1) Control Unit 104

In the DVD rental process, the control unit 104 outputs a request to obtain a device key identifier to the IC card 20 via the IC card reading unit 105.

The control unit 104 receives a device key identifier from the IC card 20 via the IC card reading unit 105.

Following this, the control unit 104 outputs a request to obtain an encrypted title key to the server apparatus 50 via the communication line 60. The control unit 104 further outputs a title ID which is read by the barcode reader 11 and a device key identifier which is obtained from the IC card 20 to the server apparatus 50 via the communication line 60.

The control unit 104 then receives an encrypted title key from the server apparatus 50 via the communication line 60.

Following this, the control unit 104 outputs a title ID, a rental end date, and an encrypted title key to the IC card 20 via the IC card reading unit 105.

2.2 Operation of the Rental System 1*a*

The following describes an operation of the rental system 1*a*, focusing primarily on the differences between the operation of the rental system 1*a* of the second embodiment and the rental system 1 of the first embodiment.

2.2.1 DVD Rental Process

Figure 13:
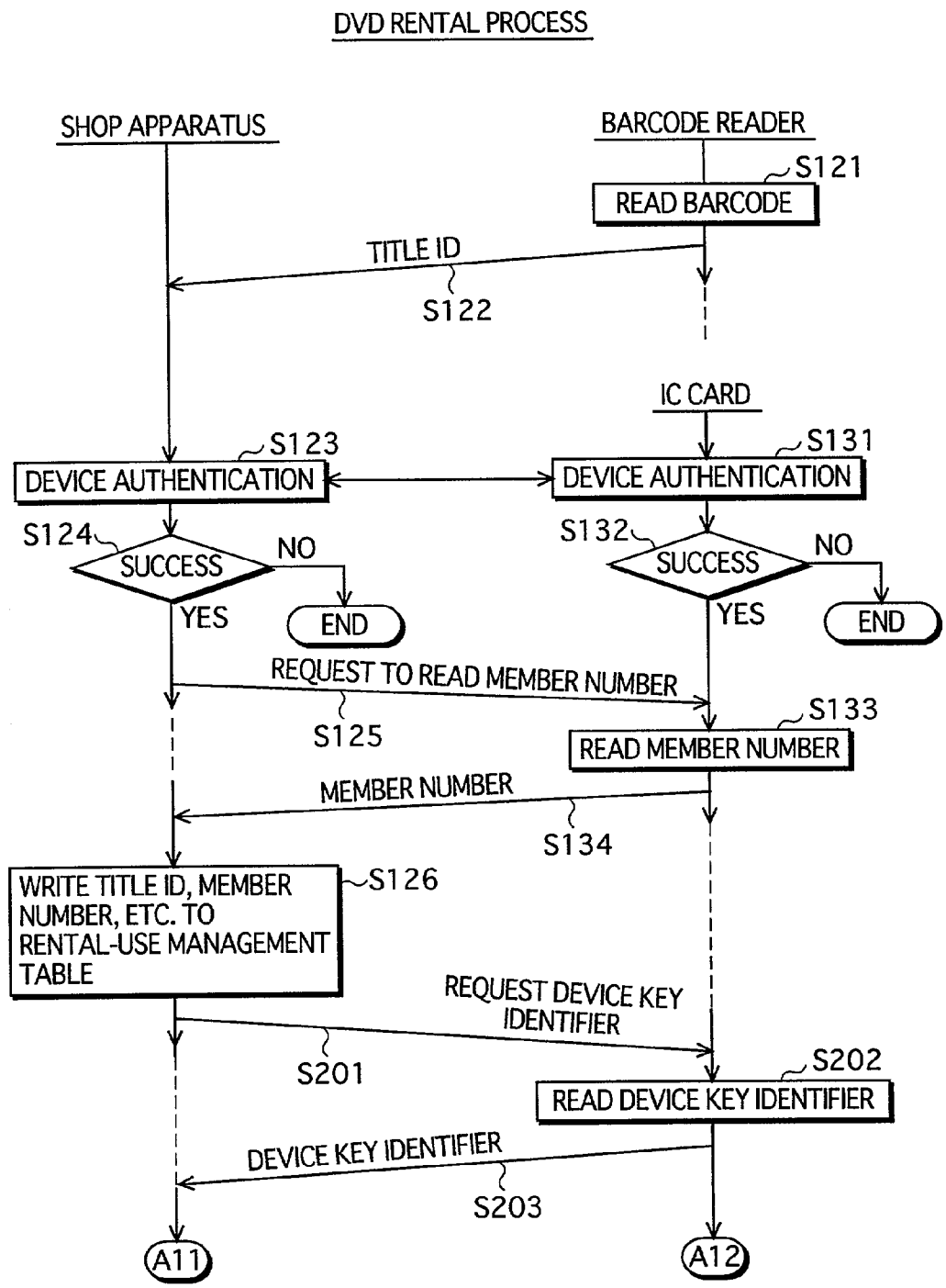
FIG. 13 is a flowchart showing an operation that is performed when a DVD is rented to a user who is a member of a rental shop, continuing to FIG. 14.
Figure 14:
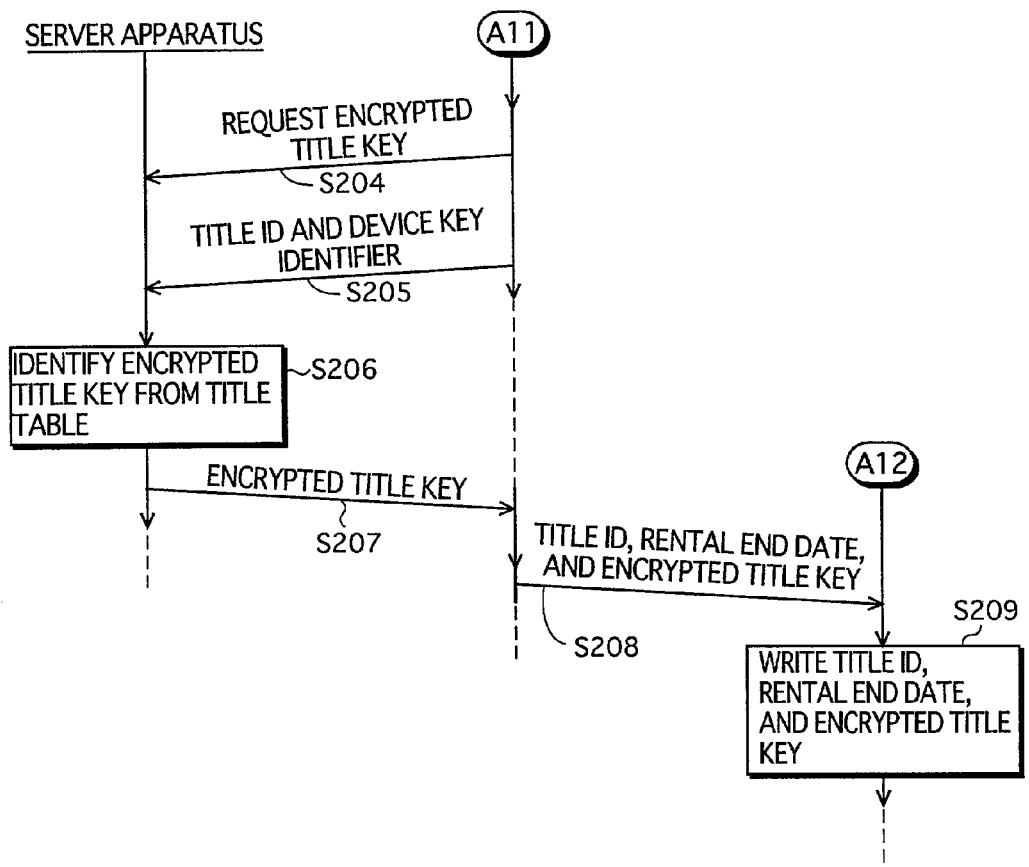
FIG. 14, continuing from FIG. 13, is a flow chart showing the operation that is performed when the DVD is rented to the user who is the member of the rental shop.

With reference to flowcharts shown in FIGS. 13 and 14, the following describes an operation that is performed when a DVD is rented to the user who is a member of the rental shop, focusing primarily on the differences between this operation and the operation shown in FIG. 8.

The control unit 104 writes the generated set of use management information to the rental-use management table 152 in step S126. Then, the control unit 104 outputs a request to obtain a device key identifier to the IC card 20 via the IC card reading unit 105 (step S201). The control unit 203 then reads the device key identifier from the information storage unit 201 (step S202), and outputs the read device key identifier to the shop apparatus 10 via the IF unit 205 (step S203).

Following this, the control unit 104 outputs the request to obtain the encrypted title key to the server apparatus 50 via the communication line 60 (step S204). The control unit 104 further outputs the title ID that is read by the barcode reader 11 and the device key identifier that is obtained from the IC card 20 to the server apparatus 50 via the communication line 60 (step S205).

The control unit 503 reads an encrypted title key corresponding to the received title ID and device key identifier from the title table 521 that is held by the information storage unit 501 (step S206). Following this, the control unit 503 outputs the read encrypted title key to the shop apparatus 10 via the transmission/reception unit 502 and the communication line 60 (step S207).

Upon receipt of the encrypted title key from the server apparatus 50 via the communication line 60 (step S207), the control unit 104 outputs the title ID, the rental end date, and the encrypted title key to the IC card 20 via the IC card reading unit 105 (step S208).

Following this, the control unit 203 writes the received encrypted title key to the information storage unit 201 as one item of the rental-use management information (step S209).

2.2.2 DVD Data Reproduction Process

Figure 15:
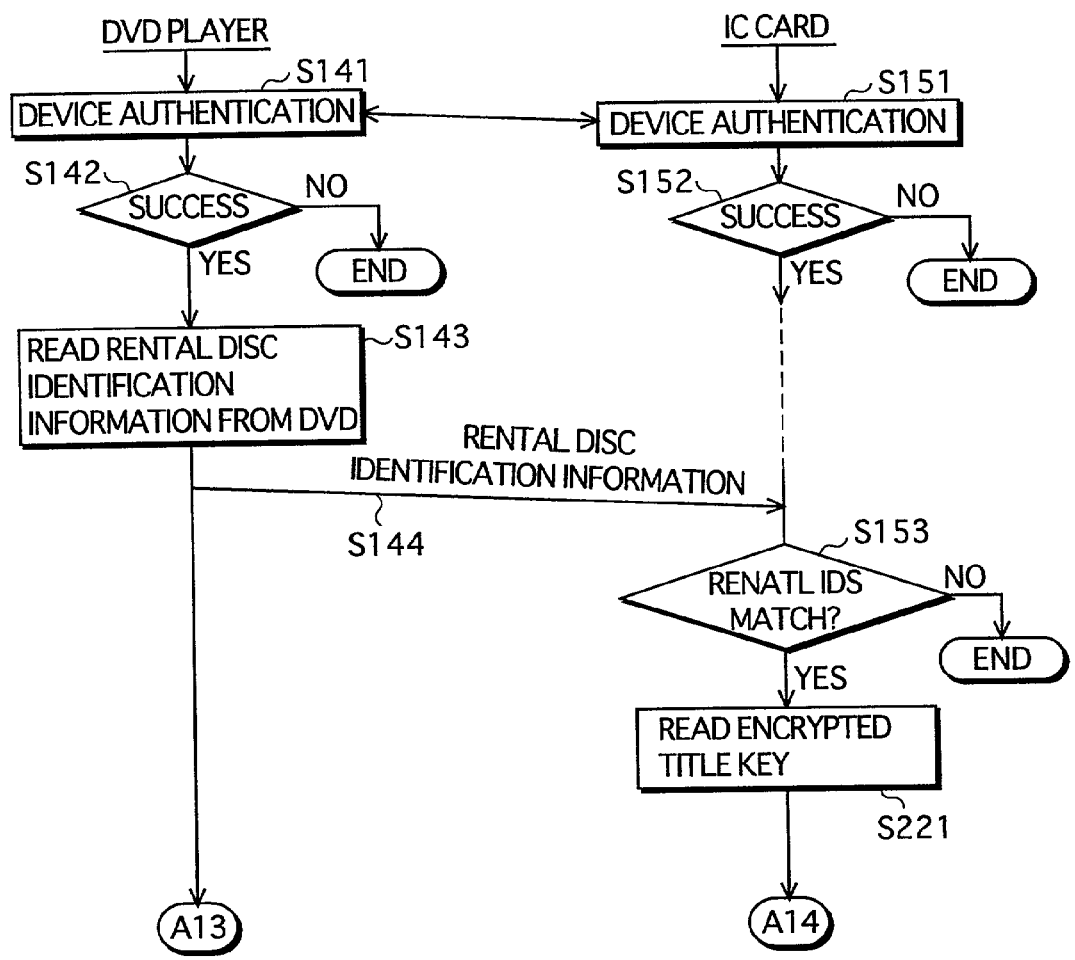
FIG. 15 is a flowchart showing an operation that is performed when digital work which is stored on the DVD 30 is reproduced by a DVD player, continuing to FIG. 16.
Figure 16:
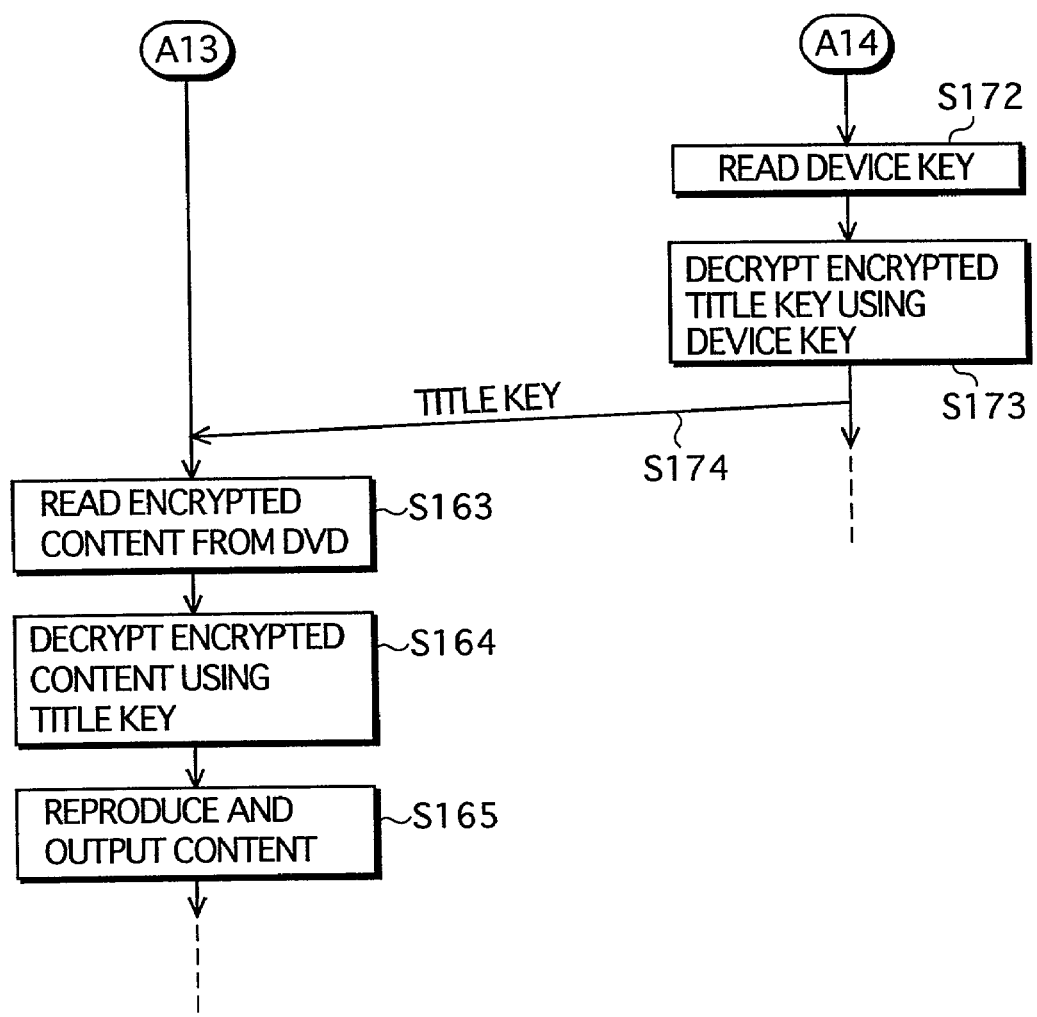
FIG. 16, continuing from FIG. 15, is a flowchart showing the operation performed when the digital work which is stored on the DVD 30 is reproduced by the DVD player.

With reference to flowcharts shown in FIGS. 15 and 16, the following describes an operation that is performed when the user to which the DVD 30 has been rented reproduces digital work which is stored on the DVD 30, focusing primarily on the differences between this operation and the operation shown in FIGS. 9 and 10.

When the control unit 203 judges that the title ID that is included in the received rental disc identification information and the read title ID match in step S153, the control unit 203 reads an encrypted title key from rental-use management information which is stored in the information storage unit 201 (step S221). Following this, the control unit 203 reads a device key in step S172.

2.3 Conclusions

As described above, in contrast to the first embodiment where an encrypted title key is stored in a DVD disc, a DVD disc available for rental does not store an encrypted title key in the second embodiment, and the shop apparatus 10 writes the encrypted title key to the IC card 20 at the rental shop when the DVD disc is rented.

Further, a device key identifier for identifying a device key has been additionally written to the IC card 20 when the IC card 20 is manufactured.

The server apparatus 50 stores an encrypted title key in correspondence with a title ID and a device key.

When a DVD disc is rented, the shop apparatus 10 reads a device key identifier from the IC card 20, obtains an encrypted title key from the server apparatus 50, and writes the obtained encrypted title key to the IC card 20 as one item of rental-use management information.

When a DVD disc is played, content which is stored on the DVD disc is reproduced based on a title ID that is stored in the DVD disc in the same manner as in the first embodiment. Here, the DVD player 40 obtains an encrypted title key from the IC card 20.

3. Other Modifications 3.1 First Modifications

Although the first embodiment describes the case where the shop apparatus 10 writes a rental end date to the IC card 20, the following modifications are also possible.

(1) Although the DVD player 40 internally has the clock unit 405 for clocking a date and time, the DVD player 40 may obtain the present date and time from an external device via a network.

(2) The above-described rental end date is a final date of a rental period during which rental is allowed, i.e., the rental end date is an absolute expiration date of the rental period. Instead of such a rental end date, the shop apparatus 10 may write a rental start date and period information showing a rental period starting from the rental start date to the IC card 20. In this case, the DVD player 40 judges whether reproduction is allowed or not by using the rental start date, the period information, and the present date and time.

Also, the shop apparatus 10 may write period information showing a rental period that begins from a date and time when content is first reproduced to the IC card 20. In this case, the DVD player 40 records the date and time when the content is first reproduced and judges whether reproduction of the content is allowed or not by using the recorded date and time, the period information, and the present date and time.

Further, the shop apparatus 10 may write the number of times digital work which is stored on the storage medium is allowed to be reproduced to the IC card 20. In this case, the DVD player 40 counts the number of times the digital work has been reproduced. The DVD player 40 judges that the digital work is allowed to be reproduced only when the counted number of times does not exceed the allowable number of times included in the right information.

3.2 Second Modifications

Although the first embodiment describes the case where an encrypted title key generated by encrypting a title key by using a device key which is unique to the IC card 20 is used, the following modifications are also possible.

The DVD 30 prestores a medium identifier which is unique to the DVD 30. Because the medium identifier is unique to the DVD 30, this medium identifier is not copied even if encrypted content and the like which are stored on the DVD 30 are copied into another DVD-RW or the like. The other DVD-RW or the like stores its own unique medium identifier which is different from the above medium identifier which is unique to the DVD 30.

The server apparatus stores a title ID, a medium identifier, and an encrypted title key in correspondence with one another. The title ID is identification information for identifying content that is digital work. The medium identifier is an identifier for identifying a DVD which stores content that is identified by the title ID. The encrypted title key is generated by encrypting a title key by using the medium identifier as a key.

When the DVD 30 is rented, the shop apparatus 10 writes an encrypted title key that is stored in correspondence with a title ID identifying content which is stored on a DVD to be rented from the server apparatus to the IC card 20 as one item of rental-use management information.

To reproduce encrypted content which is stored on the DVD 30, the DVD player 40 obtains the encrypted title key from the IC card 20, obtains a medium identifier from the DVD 30, and decrypts the encrypted title key by using the obtained medium identifier so as to generate a title key. Then, by using the generated title key, the DVD player 40 decrypts the encrypted content which is stored on the DVD 30 so as to generate content, and outputs the generated content.

As described above, a key that is used to encrypt a title key to generate an encrypted title key is a medium identifier stored in the DVD 30. Therefore, even if information which is stored on the DVD 30 is copied to another DVD by an unauthorized user, a medium identifier that is read from the other DVD is not the same as the above medium identifier. Therefore, the encrypted title key cannot be decrypted properly. As a result, the encrypted content cannot be decrypted properly. In this way, unauthorized reproduction of content by such an unauthorized user who copies information which is stored on the DVD 30 to another DVD can be prevented.

3.3 Modifications 3

The IC card 20 can be used for various applications. Examples of the various applications include a DVD rental function, a membership card function, a point provision function, a credit card function, an electric money function, and a prepaid card function.

The information storage unit 201 in the IC card 20 includes a plurality of application areas for securely storing information in one-to-one correspondence with a plurality of application functions. Each application area stores information to be utilized by the corresponding application function.

(Membership Card Function)

One of the application functions is a membership card function of identifying a member of the rental shop. The application area corresponding to the membership card function is used to store a member number that identifies the user.

The membership card function is described in the first embodiment.

(Bonus Provision Function for Providing Point Information)

Another one of the application functions is a bonus provision function of providing, from the rental agent to the user, point information as a membership bonus in accordance with use of the DVD. The information storage unit 201 in the IC card 20 includes one application area corresponding to the bonus provision function. The shop apparatus 10 additionally writes, to the application area, point information showing the number of points that are determined in accordance with DVD rental, i.e., in accordance with a payment for reproduction of the digital work which is stored on the DVD, or a payment for a product purchase.

To collect the payment from the user, the shop apparatus 10 sends a request to the IC card 20 to deduct the number of points that are designated by the user from the number of points shown by the point information which is stored in the application area as a part or all of the payment. The IC card 20 deducts the number of points that are designated by the user from the number of points shown by the point information as requested by the shop apparatus 10.

(Electric Money Function)

Another one of the application function is a payment function, i.e., an electric money function, for the user to make a payment for rental to the rental agent. The information storage unit 201 in the IC card 20 includes one application area corresponding to the electric money function. The application area prestores electric money information showing a predetermined amount of electric money that can be used instead of actual money.

To collect the payment from the user, the shop apparatus 10 sends a request to the IC card 20 to obtain electric money information showing an amount of electric money corresponding to the payment from the IC card 20.

The IC card 20 includes the following payment unit. In response to the request from the shop apparatus 10, the payment unit transmits the electric money information showing the amount of electric money corresponding to the payment to the shop apparatus 10, and deducts the amount of electric money corresponding to the payment from the amount of money shown by the electric money information which is stored in the application area.

The shop apparatus 10 receives the electric money information showing the amount of electric money corresponding to the payment from the IC card 20, and stores the received electric money information.

(Prepaid Card Function)

Another one of the application functions is a payment function, i.e., a prepaid card function, for the user to make a payment for rental to the rental agent. The information storage unit 201 in the IC card 20 includes one application area corresponding to the prepaid card function. The application area prestores electric ticket information showing electric tickets that can be used to pay for reproduction of the digital work.

When reproducing the digital work which is stored on the DVD 30, the DVD player 40 sends a request to the IC card 20 to deduct electric tickets corresponding to a payment that is determined in accordance with reproduction of the digital work from the electric tickets shown by the electric ticket information which is stored in the application area.

Here, the DVD player 40 obtains information corresponding to the remaining electric tickets that are shown by the electric ticket information stored in the IC card 20 before reproducing the digital work stored in the DVD 30. When the remaining electric tickets are less than the electric tickets corresponding to the payment that is determined in accordance with the reproduction of the digital work, the DVD player 40 judges that the digital work is not allowed to be used and thus prohibits reproduction of the digital work. On the other hand, when the remaining electric tickets are greater than or equal to the electric tickets corresponding to the payment that is determined in accordance with the reproduction of the digital work, the DVD player 40 judges that the digital work is allowed to be used and thus permits reproduction of the digital work.

Also, the DVD player 40 may send a request to the IC card 20 to deduct electric tickets corresponding to a payment for a one-time reproduction from the electric tickets shown by the electric ticket information which is stored in the application area every time the digital work is reproduced. Alternatively, when the digital work is reproduced one or more times during a predetermined period of time, the DVD player 40 may send a request to the IC card 20 to deduct electric tickets corresponding to a payment for reproduction of one or more times during the predetermined period of time from the electric tickets shown by the electric ticket information which is stored in the application area.

The IC card 20 includes a payment unit that deducts the electric tickets corresponding to the payment from the electric tickets shown by the electric ticket information stored in the application area as requested by the DVD player 40.

3.4 Other Modifications

The following modifications are also possible.

(1) A DVD may store a plurality of content IDs, the same number of encrypted contents, the same number of encrypted content keys, and one encrypted disc key. The plurality of content IDs, the encrypted contents, and the encrypted content keys respectively correspond to one another.

The encrypted contents are each generated by encrypting a different content by using a different content key.

The encrypted content keys are each generated by encrypting a different content key by using one disc key.

The encrypted disc key is generated by encrypting the disc key by using one device key.

The disc key is unique to a DVD of one type.

The device key is unique to one IC card and is stored in the IC card.

To reproduce encrypted content stored in a DVD, the IC card obtains an encrypted disc key and an encrypted content key corresponding to the content to be reproduced from the DVD player. The IC card then internally reads a device key, and decrypts the encrypted disc key by using the read device key so as to generate a disc key. The IC card then decrypts the encrypted content key by using the generated disc key so as to generate a content key, and outputs the generated content key to the DVD player.

The DVD player receives the content key, and decrypts the encrypted content that is read from the DVD by using the received content key so as to generate content.

(2) Although the above embodiments describe the case where a DVD which stores encrypted digital content is rented, a storage medium to be rented should not be limited to a DVD. For example, a CD-ROM, a DVD-ROM, a DVD-RAM, and a BD (Blu-ray Disc) may be used.

(3) Although the above embodiments describe the case where DES is used as an encryption algorithm and a decryption algorithm, other encryption techniques may be used.

(4) The shop apparatus may have a register function of calculating amounts of money involved in a transaction.

(5) Although the second embodiment describes the case where the server apparatus 50 is located distant from the rental shop, it is to be understood that the present invention is not limited thereto. For example, the server apparatus 50 may be located in the rental shop where the shop apparatus 10 is located, or the shop apparatus 10 and the server apparatus 50 may be integrated into one apparatus.

(6) The present invention may also be realized by methods described in the above embodiments. Also, the methods may be realized by computer programs to be executed on a computer, or by digital signals that are made up of the computer programs.

Further, the present invention may be realized by a computer-readable storage medium which stores the computer programs or the digital signals. Examples of the computer-readable recording medium include a flexible disk, a hard disk, a CD-ROM, an MO, a DVD, a DVD-ROM, a DVD-RAM, a BD, and a semiconductor memory. Also, the present invention may be realized by the computer programs, or by the digital signals stored in such a storage medium.

Also, the present invention may be realized by the computer programs or the digital signals being transmitted via an electric communication line, a wireless or cable communication line, or a network such as the Internet.

Moreover, the present invention may be realized by a computer system including a microprocessor and a memory. Here, the memory may store the computer programs, and the microprocessor may operate in accordance with the computer programs.

By storing the computer programs or the digital signals in any of the storage mediums listed above and transferring the storage mediums to an independent computer system, or by transmitting the computer programs or the digital signals to an independent computer system via a network, the computer programs or the digital signals may be executed in the independent computer system.

(7) The above embodiments of the present invention and the stated modifications may be combined.

Although the present invention has been fully described by way of examples with reference to the accompanying drawings, it is to be understood that various changes and modifications will be apparent to those skilled in the art. Therefore, unless such changes and modifications depart from the scope of the present invention, they should be construed as being included therein.

What is claimed is:

1. A storage-medium rental system for temporarily providing a right to use digital work to a user from a rental agent, said storage-medium rental system comprising:

a portable storage medium for storing the digital work thereon, and for prestoring content information representing the digital work;

a portable semiconductor memory having an area for securely storing information;

a rental-shop apparatus operable to securely write right information, which indicates a range of a right to use the digital work stored on said portable storage medium, into said area of said portable semiconductor memory when the rental agent rents said portable storage medium to the user; and a reproduction apparatus operable to, upon receiving an instruction from the user to reproduce the digital work stored on said portable storage medium, securely read the right information from said area of said portable semiconductor memory, judge whether the digital work is allowed to be used or not by the user based on the read right information, and read the content information from said portable storage medium and reproduce the digital work based on the read content information only when judging that the digital work is allowed to be used;

wherein said portable conductor memory is connected to said rental-shop apparatus when the rental agent rents said portable storage medium to the user, and said portable storage medium and said portable semiconductor memory are connected to said reproduction apparatus when the user reproduces the digital work;

wherein the user makes a rental payment to the rental agent when the rental agent rents said portable storage medium to the user, and said rental-shop apparatus is operable to securely write the right information into said area of said portable semiconductor memory when the rental agent receives the rental payment from the user; and wherein said portable storage medium is operable to store first identification information, which identifies the digital work, in correspondence with the content information, said rental-shop apparatus is operable to write the right information including second identification information, which identifies the digital work, into said area of said portable semiconductor memory, and said reproduction apparatus is operable to compare the first identification information stored in said portable storage medium and the second identification information included in the read right information, and to judge that the digital work identified by the content information stored in correspondence with the first identification information is allowed to be used only when the first identification information and the second identification information match.

2. The storage-medium rental system of claim 1, wherein:

the content information stored in said portable storage medium is generated by encrypting the digital work by using a content key;

said rental-shop apparatus is operable to securely write the right information including an encrypted content key that is generated by encrypting the content key by using a device key into said area of said portable semiconductor memory;

said portable semiconductor memory is further operable to prestore the device key, which is unique to said portable semiconductor memory, in said area;

said portable semiconductor memory further includes a decryption unit operable to decrypt the encrypted content key stored in said area by using the device key stored in said area so as to generate the content key, and to output the generated content key; and said reproduction apparatus is operable to, upon receiving the reproduction instruction from the user, receive the content key from said portable semiconductor memory, and to decrypt the read content information by using the received content key so as to reproduce the digital work.

3. The storage-medium rental system of claim 1, wherein:

the content information stored in said portable storage medium is generated by encrypting the digital work by using a content key;

said portable storage medium is operable to store a disc key that is unique to said portable storage medium;

said rental shop apparatus is operable to securely write the right information including an encrypted content key that is generated by encrypting the content key by using the disc key into said area of said portable semiconductor memory;

said portable semiconductor memory further includes a decryption unit operable to obtain the disc key from said portable storage medium via said reproduction apparatus, to decrypt the encrypted content key stored in said area by using the obtained disc key so as to generate the content key, and to output the generated content key; and said reproduction apparatus is operable to, upon receiving the reproduction instruction from the user, to receive the content key from said portable semiconductor memory, to decrypt the read content information by using the received content key, and to reproduce the digital work.

4. A storage-medium rental system for temporarily providing a right to use digital work to a user from a rental agent, said storage-medium rental system comprising:

a portable storage medium for storing the digital work thereon, and for prestoring content information representing the digital work;

a portable semiconductor memory having an area for securely storing information;

a rental-shop apparatus operable to securely write right information, which indicates a range of a right to use the digital work stored on said portable storage medium, into said area of said portable semiconductor memory when the rental agent rents said portable storage medium to the user; and a reproduction apparatus operable to, upon receiving an instruction from the user to reproduce the digital work stored on said portable storage medium,
securely read the right information from said area of said portable semiconductor memory,
judge whether the digital work is allowed to be used or not by the user based on the read right information, and
read the content information from said portable storage medium and reproduce the digital work based on the read content information only when judging that the digital work is allowed to be used;

wherein said portable semiconductor memory is connected to said rental-shop apparatus when the rental agent rents said portable storage medium to the user, and said portable storage medium and said portable semiconductor memory are connected to said reproduction apparatus when the user reproduces the digital work;

wherein the user makes a rental payment to the rental agent when the rental agent rents said portable storage medium to the user, and said rental-shop apparatus is operable to securely write the right information into said area of said portable semiconductor memory when the rental agent receives the rental payment from the user;

wherein said area of said portable semiconductor memory includes a plurality of application areas which are respectively provided in one-to-one correspondence with a plurality of application functions, each of said plurality of application areas being provided for securely storing information for the corresponding application function;

wherein a first application function of the plurality of application functions is a rental function of renting said portable storage medium for use in the storage-medium rental system, and said application area corresponding to the rental function is used to store the right information; and wherein a second application function of the plurality of application functions is a membership card function of identifying a member of a rental shop, and said application area corresponding to the membership card function is used to store a member number that identifies the user.

5. The storage-medium rental system of claim 4, wherein:

a third application function of the plurality of application functions is a bonus provision function of providing, from the rental agent to the user, point information as a bonus in accordance with use of said portable storage medium, and said application area corresponding to the bonus provision function is used to store point information indicating a predetermined number of points that can be used to make a payment for reproduction of the digital work;

said rental-shop apparatus is operable to, when the rental agent receives the payment from the user, send a request to said portable semiconductor memory to deduct a number of points designated by the user from the predetermined number of points indicated by the point information as a part or all of the payment for the reproduction of the digital work; and said semiconductor memory further includes a payment unit operable to deduct, according to a request by said rental shop-apparatus, the designated number of points from the predetermined number of points indicated by the point information.

6. The storage-medium rental system of claim 5, wherein said rental-shop apparatus is operable to generate point information indicating a number of points in accordance with the payment when the rental agent receives the payment from the user, and to write the generated point information into said application area of said portable semiconductor memory corresponding to the bonus provision function.

7. A storage-medium rental system for temporarily providing a right to use digital work to a user from a rental agent, said storage-medium rental system comprising:

a portable storage medium for storing the digital work thereon, and for prestoring content information representing the digital work;

a portable semiconductor memory having an area for securely storing information;

a rental-shop apparatus operable to securely write right information, which indicates a range of a right to use the digital work stored on said portable storage medium, into said area of said portable semiconductor memory when the rental agent rents said portable storage medium to the user; and a reproduction apparatus operable to, upon receiving an instruction from the user to reproduce the digital work stored on said portable storage medium,
securely read the right information from said area of said portable semiconductor memory,
judge whether the digital work is allowed to be used or not by the user based on the read right information, and
read the content information from said portable storage medium and reproduce the digital work based on the read content information only when judging that the digital work is allowed to be used;

wherein said portable semiconductor memory is connected to said rental-shop apparatus when the rental agent rents said portable storage medium to the user, and said portable storage medium and said portable semiconductor memory are connected to said reproduction apparatus when the user reproduces the digital work;

wherein the user makes a rental payment to the rental agent when the rental agent rents said portable storage medium to the user, and said rental-shop apparatus is operable to securely write the right information into said area of said portable semiconductor memory when the rental agent receives the rental payment from the user;

wherein said area of said portable semiconductor memory includes a plurality of application areas which are respectively provided in one-to-one correspondence with a plurality of application functions, each of said plurality of application areas being provided for securely storing information for the corresponding application function;

wherein a first application function of the plurality of application functions is a rental function of renting said portable storage medium for use in the storage-medium rental system, and said application area corresponding to the rental function is used to store the right information;

wherein a second application function of the plurality of application functions is a payment function that is used to make the rental payment from the user to the rental agent, and said application area corresponding to the payment function prestores electric money information indicating a predetermined amount of electric money that can be used instead of actual money;

wherein said rental-shop apparatus is operable to, when the rental agent receives the payment from the user, send a request to said portable semiconductor memory to deduct an amount of electric money corresponding to the rental payment from the predetermined amount of electric money indicated by the electric money information, to receive electric money information indicating the amount of electric money corresponding to the payment from said portable semiconductor memory, and to store the received electric money information; and wherein said portable semiconductor memory further includes a payment unit operable to transmit the electric money information indicating the amount of electric money corresponding to the payment to said rental-shop apparatus as requested by said rental-shop apparatus, and to deduct the amount of electric money corresponding to the payment from the predetermined amount of electric money indicated by the electric money information stored in said application area corresponding to the payment function.

8. A storage-medium rental system for temporarily providing a right to use digital work to a user from a rental agent, said storage-medium rental system comprising:

a portable storage medium for storing the digital work thereon, and for prestoring content information representing the digital work;

a portable semiconductor memory having an area for securely storing information;

a rental-shop apparatus operable to securely write right information, which indicates a range of a right to use the digital work stored on said portable storage medium, into said area of said portable semiconductor memory when the rental agent rents said portable storage medium to the user; and a reproduction apparatus operable to, upon receiving an instruction from the user to reproduce the digital work stored on said portable storage medium,
securely read the right information from said area of said portable semiconductor memory,
judge whether the digital work is allowed to be used or not by the user based on the read right information, and
read the content information from said portable storage medium and reproduce the digital work based on the read content information only when judging that the digital work is allowed to be used;

wherein said portable semiconductor memory is connected to said rental-shop apparatus when the rental agent rents said portable storage medium to the user, and said portable storage medium and said portable semiconductor memory are connected to said reproduction apparatus when the user reproduces the digital work;

wherein said area of said portable semiconductor memory includes a plurality of application areas which are respectively provided in one-to-one correspondence with a plurality of application functions, each of said plurality of application areas being provided for securely storing information for the corresponding application function;

wherein a first application function of the plurality of application functions is a rental function of renting said portable storage medium for use in the storage-medium rental system, and said application area corresponding to the rental function is used to store the right information;

wherein a second application function of the plurality of application functions is a payment function that is used to make a rental payment from the user to the rental agent, and said application area corresponding to the payment function prestores electric ticket information indicating electric tickets that can be used to make a payment for reproduction of the digital work, said reproduction apparatus, when reproducing the digital work, is operable to send a request to said portable semiconductor memory to deduct electric tickets corresponding to the payment determined in accordance with the reproduction of the digital work from the electric tickets indicated by the electric ticket information, and said semiconductor memory further includes a payment unit operable to deduct, in accordance with a request by said reproduction apparatus, the electric tickets corresponding to the payment from the electric tickets indicated by the electric ticket information stored in said application area corresponding to the payment function.

9. The storage-medium rental system of claim 8, wherein said reproduction apparatus is operable to obtain, before reproducing the digital work, electric ticket information indicating remaining electric tickets from said portable semiconductor memory, and to judge that the digital work is not allowed to be used so as to prohibit the digital work from being reproduced when the remaining electric tickets are less than the electric tickets corresponding to the payment determined in accordance with the reproduction of the digital work.

10. The storage-medium rental system of claim 9, wherein said reproduction apparatus is operable to send a request to said portable semiconductor memory to deduct electric tickets corresponding to a payment for a one-time reproduction from the electric tickets shown indicated by the electric ticket information every time the digital work is reproduced.

11. The storage-medium rental system of claim 9, wherein said reproduction apparatus, when reproducing the digital work one or more times during a predetermined period of time, is operable to send a request to said portable semiconductor memory to deduct electric tickets corresponding to a payment for the reproduction of the digital work during the predetermined period of time from the electric tickets indicated by the electric ticket information.

12. A rental-shop apparatus that constitutes a storage-medium rental system for temporarily providing, from a rental agent to a user, a right to use digital work stored on a portable storage medium so that the user may reproduce the digital work with a reproduction apparatus, wherein:
  a portable semiconductor memory is connected to said rental-shop apparatus when the rental agent rents the portable storage medium to the user;
  the portable storage medium is operable to prestore content information representing the digital work, and to store first identification information, which identifies the digital work, in correspondence with the content information;
  the portable semiconductor memory has an area for securely storing information;
  said rental-shop apparatus is operable to securely write right information including second identification information, which identifies the digital work, into the area of the portable semiconductor memory when the rental agent rents the portable storage medium to the user, the right information indicating a range of the right to use the digital work stored on the portable storage medium; and
  the reproduction apparatus is operable to
    securely read the right information from the area of the portable semiconductor memory,
    compare the first identification information stored in the portable storage medium and the second information included in the read right information, and
    judge that the digital work identified by the content information stored in correspondence with the first identification information is allowed to be used only when the first identification information and the second identification information match.

13. A reproduction apparatus that constitutes a storage-medium rental system for temporarily providing, from a rental agent to a user, a right to use digital work stored on a portable storage medium, wherein:
  a portable semiconductor memory is connected to a rental-shop apparatus when the rental agent rents the portable storage medium to the user;
  the portable storage medium and the portable semiconductor memory are connected to said reproduction apparatus when the user reproduces the digital work;
  the portable storage medium is operable to prestore content information representing the digital work;
  the portable semiconductor memory has an area for securely storing information;
  the rental-shop apparatus is operable to securely write right information into the area of the portable semiconductor memory when the rental agent rents the portable storage medium to the user, the right information indicating a range of the right to use the digital work stored on the portable storage medium; and
  said reproduction apparatus is operable to, upon receiving an instruction from the user to reproduce the digital work,
    securely read the right information from the area of the semiconductor memory,
    judge whether the digital work is allowed to be used or not based on the read right information, and
    read the content information from the portable storage medium and reproduce the digital work based on the read content information only when judging that the digital work is allowed to be used.

14. A rental method used in a storage-medium rental system for temporarily providing, from a rental agent to a user, a right to use digital work stored on a portable storage medium, where a portable semiconductor memory is connected to a rental-shop apparatus when the rental agent rents the portable storage medium to the user, and the portable storage medium and the portable semiconductor memory are connected to a reproduction apparatus when the user reproduces the digital work, wherein:
  the storage-medium rental system includes
    the portable storage medium which is operable to prestore content
    information representing the digital work,
    the portable semiconductor memory which has an area for securely storing information,
    the rental-shop apparatus, and
    the reproduction apparatus; and
  said rental method comprises:
    the rental-shop apparatus securely writing right information into the area of the portable semiconductor memory when the rental agent rents the portable storage medium to the user, the right information indicating a range of the right to use the digital work stored on the portable storage medium; and
    the reproduction apparatus, upon receiving an instruction from the user to reproduce the digital work,
      securely reading the right information from the area of the portable semiconductor memory,
      judging whether the digital work is allowed to be used or not based on the read right information, and
      reading the content information from the portable storage medium and reproducing the digital work based on the read content information only when said judging of whether the digital work is allowed to be used judges that the digital work is allowed to be used.

15. A computer program for rental that is used in a storage-medium rental system for temporarily providing, from a rental agent to a user, a right to use digital work stored on a portable storage medium, where a portable semiconductor memory is connected to a rental-shop apparatus when the rental agent rents the portable storage medium to the user, and the portable storage medium and the portable semiconductor memory are connected to a reproduction apparatus when the user reproduces the digital work, wherein:
  the storage-medium rental system includes:
    the portable storage medium which is operable to prestore content
    information representing the digital work,
    the portable semiconductor memory which has an area for securely storing information,
    the rental-shop apparatus, and
    the reproduction apparatus; and said computer program comprises:
the rental-shop apparatus securely writing right information into the area of the portable semiconductor memory when the rental agent rents the portable storage medium to the user, the right information indicating a range of the right to use the digital work stored on the portable storage medium; and
the reproduction apparatus, upon receiving an instruction from the user to reproduce the digital work,
securely reading the right information from the area of the portable semiconductor memory,
judging whether the digital work is allowed to be used or not based on the read right information, and
reading the content information from the portable storage medium and reproducing the digital work based on the read content information only when said judging of whether the digital work is allowed to be used judges that the digital work is allowed to be used.

16. A computer-readable program storage medium having a computer program for rental stored thereon that is used in a storage-medium rental system for temporarily providing, from a rental agent to a user, a right to use digital work stored on a portable storage medium, where a portable semiconductor memory is connected to a rental-shop apparatus when the rental agent rents the portable storage medium to the user, and the portable storage medium and the portable semiconductor memory are connected to a reproduction apparatus when the user reproduces the digital work, wherein:
the storage-medium rental system includes:
the portable storage medium which is operable to prestore content information representing the digital work,
the portable semiconductor memory which has an area for securely storing information,
the rental-shop apparatus, and
the reproduction apparatus; and
said computer program comprises:
the rental-shop apparatus securely writing right information into the area of the portable semiconductor memory when the rental agent rents portable storage medium to the user, the right information indicating a range of the right to use the digital work stored on the portable storage medium; and
the reproduction apparatus, upon receiving an instruction from the user to reproduce the digital work,
securely reading the right information from the area of the portable semiconductor memory,
judging whether the digital work is allowed to be used or not based on the read right information, and
reading the content information from the portable storage medium and reproducing the digital work based on the read content information only when said judging of whether the digital work is allowed to be used judges that the digital work is allowed to be used.

17. A storage-medium rental system for temporarily providing a right to use digital work to a user from a rental agent, said storage-medium rental system comprising:
a portable storage medium for storing the digital work thereon, and for prestoring content information representing the digital work;
a portable semiconductor memory having an area for securely storing information;
a rental-shop apparatus operable to securely write right information, which indicates a range of a right to use the digital work stored on said portable storage medium, into said area of said portable semiconductor memory when the rental agent rents said portable storage medium to the user; and
a reproduction apparatus operable to, upon receiving an instruction from the user to reproduce the digital work stored on said portable storage medium,
securely read the right information from said area of said portable semiconductor memory,
judge whether the digital work is allowed to be used or not by the user based on the read right information, and
read the content information from said portable storage medium and reproduce the digital work based on the read content information only when judging that the digital work is allowed to be used;
wherein said portable conductor memory is connected to said rental-shop apparatus when the rental agent rents said portable storage medium to the user, and said portable storage medium and said portable semiconductor memory are connected to said reproduction apparatus when the user reproduces the digital work;
wherein the user makes a rental payment to the rental agent when the rental agent rents said portable storage medium to the user, and said rental-shop apparatus is operable to securely write the right information into said area of said portable semiconductor memory when the rental agent receives the rental payment from the user;
wherein said portable storage medium is operable to store first identification information, which identifies the digital work, in correspondence with the content information;
wherein the content information prestored in said portable storage medium is generated by encrypting the digital work by using an encryption key;
wherein said rental-shop apparatus operable to write the right information including a decryption key to be used to decrypt the content information and second identification information, which identifies the digital work, into said area of said portable semiconductor memory; and
wherein said reproduction apparatus is operable to
compare the first identification information stored in said portable storage medium and the second identification information included in the read right information,
judge that the digital work identified by the content information stored in correspondence with the first identification information is allowed to be used only when the first identification information and the second identification match, and
decrypt the read content information by using the decryption key included in the read right information so as to generate the digital work when judging that the digital work is allowed to be used.

* * * * *